United States Patent
Avakian et al.

(10) Patent No.: US 11,768,030 B2
(45) Date of Patent: *Sep. 26, 2023

(54) SMART MOVABLE CLOSURE SYSTEM FOR COOLING CABINET

(71) Applicant: Cooler Screens Inc., Chicago, IL (US)

(72) Inventors: Arsen Avakian, Chicago, IL (US); Robert Edwin Dravenstott, Centennial, CO (US)

(73) Assignee: Cooler Screens Inc., Chicago, IL (US)

( * ) Notice: Subject to any disclaimer, the term of this patent is extended or adjusted under 35 U.S.C. 154(b) by 135 days.

This patent is subject to a terminal disclaimer.

(21) Appl. No.: 15/931,971

(22) Filed: May 14, 2020

(65) Prior Publication Data

US 2020/0300538 A1    Sep. 24, 2020

Related U.S. Application Data

(63) Continuation-in-part of application No. 16/741,581, filed on Jan. 13, 2020, which is a continuation-in-part
(Continued)

(51) Int. Cl.
*G06Q 30/00* (2012.01)
*F25D 29/00* (2006.01)
(Continued)

(52) U.S. Cl.
CPC ......... *F25D 29/003* (2013.01); *F25D 29/005* (2013.01); *G06Q 10/087* (2013.01);
(Continued)

(58) Field of Classification Search
None
See application file for complete search history.

(56) References Cited

U.S. PATENT DOCUMENTS 2,002,322 A    5/1935    Kraemer
4,371,870 A    2/1983    Biferno
(Continued)

FOREIGN PATENT DOCUMENTS

CN    102113033 B    3/2014
CN    105513052 A    4/2016
(Continued)

OTHER PUBLICATIONS

Jun. 1, 2021—(TW) Notice of Allowance Application No. 108146270.
(Continued)

*Primary Examiner* — Michael Bekerman
(74) *Attorney, Agent, or Firm* — Banner & Witcoff, Ltd.

(57) ABSTRACT

A smart, movable closure system that allows access to the interior from the exterior of the cabinet, is disclosed. In some embodiments, the movable structure may be coupled with a cabinet interior that is adapted to be kept at a temperature cooler than the exterior cabinet ambient temperature, for example, to store perishable consumer goods in a retail setting. In particular, the smart, movable closure system may include electronic components that display graphical renderings corresponding to one or more products stored in the retail product container. In addition, the smart, movable closure system may include a controller that that determines an inventory status of products in the closure system, and based on the determined inventory status, controls the graphical renderings.

20 Claims, 22 Drawing Sheets

Related U.S. Application Data of application No. PCT/US2019/066869, filed on Dec. 17, 2019, application No. 15/931,971 is a continuation-in-part of application No. PCT/US2019/066869, filed on Dec. 17, 2019.

(51) Int. Cl.
*G06Q 10/087* (2023.01)
*G06Q 30/0251* (2023.01)

(52) U.S. Cl.
CPC ..... *G06Q 30/0251* (2013.01); *F25D 2400/36* (2013.01); *F25D 2500/06* (2013.01); *F25D 2700/06* (2013.01)

(56) References Cited

U.S. PATENT DOCUMENTS

| | | |
|---|---|---|
| 4,671,582 A | 6/1987 | Stromquist et al. |
| 4,893,902 A | 1/1990 | Baughman et al. |
| 4,998,382 A | 3/1991 | Kostos et al. |
| 5,024,023 A | 6/1991 | Kostos et al. |
| 5,111,618 A | 5/1992 | Kaspar et al. |
| 5,116,274 A | 5/1992 | Artwohl et al. |
| 5,255,473 A | 10/1993 | Kaspar et al. |
| 5,270,843 A | 12/1993 | Wang |
| 5,645,330 A | 7/1997 | Artwohl et al. |
| 6,005,652 A | 12/1999 | Matsuhira |
| 6,148,563 A | 11/2000 | Roche et al. |
| 6,377,228 B1 | 4/2002 | Jenkin et al. |
| 6,427,772 B1 | 8/2002 | Oden et al. |
| 6,475,087 B1 | 11/2002 | Cole |
| 6,476,885 B1 | 11/2002 | Murray et al. |
| 6,606,832 B2 | 8/2003 | Richardson et al. |
| 6,606,833 B2 | 8/2003 | Richardson et al. |
| 6,874,903 B2 | 4/2005 | Yang et al. |
| 7,072,096 B2 | 7/2006 | Holman et al. |
| 7,121,675 B2 | 10/2006 | Ter-Hovhannisian |
| 7,259,359 B2 | 8/2007 | Davey et al. |
| 7,290,707 B2 | 11/2007 | Sawasaki |
| 7,319,407 B2 | 1/2008 | Jang et al. |
| 7,377,125 B2 | 5/2008 | Seiden et al. |
| 7,413,233 B1 | 8/2008 | Jung |
| 7,513,637 B2 | 4/2009 | Kelly et al. |
| 7,593,867 B2 | 9/2009 | Deakin et al. |
| 7,824,056 B2 | 11/2010 | Madireddi et al. |
| 7,870,686 B2 | 1/2011 | Hines |
| 7,934,384 B2 | 5/2011 | Tuskiewicz et al. |
| 7,978,184 B2 | 7/2011 | Morrison |
| 8,009,864 B2 | 8/2011 | Linaker et al. |
| 8,189,855 B2 | 5/2012 | Opalach et al. |
| 8,219,438 B1 | 7/2012 | Moon et al. |
| 8,335,254 B1 | 12/2012 | Fernandez et al. |
| 8,468,059 B2 | 6/2013 | Enqvist |
| 8,630,924 B2 | 1/2014 | Groenevelt et al. |
| 8,672,427 B2 | 3/2014 | Hammonds |
| 8,683,745 B2 | 4/2014 | Artwohl et al. |
| 8,955,261 B2 | 2/2015 | Kobe et al. |
| 8,972,291 B2 | 3/2015 | Rimnac et al. |
| 9,046,294 B2 | 6/2015 | Lee et al. |
| 9,052,536 B2 | 6/2015 | Artwohl et al. |
| 9,098,825 B2 | 8/2015 | Bashkin |
| 9,144,328 B2 | 9/2015 | Seeley |
| 9,155,405 B2 | 10/2015 | Artwohl et al. |
| 9,230,386 B2 | 1/2016 | Roh et al. |
| 9,280,757 B2 | 3/2016 | Parpia et al. |
| 9,336,508 B2 | 5/2016 | Soon-Shiong |
| 9,349,238 B2 | 5/2016 | Tkachenko et al. |
| 9,361,628 B2 | 6/2016 | Stark |
| 9,504,338 B2 | 11/2016 | Artwohl et al. |
| 9,514,661 B2 | 12/2016 | Riegel |
| 9,524,419 B2 | 12/2016 | Chang |
| 9,560,777 B2 | 1/2017 | Krietzman et al. |
| 9,575,558 B2 | 2/2017 | Almen et al. |
| 9,689,603 B2 | 6/2017 | Roh et al. |
| 9,710,992 B2 | 7/2017 | Borra |
| 9,860,491 B2 | 1/2018 | Park et al. |
| 9,881,528 B2 | 1/2018 | Dunn |
| 9,911,377 B2 | 3/2018 | Howard et al. |
| 9,915,471 B2 | 3/2018 | Kim et al. |
| 9,959,568 B2 | 5/2018 | Klearman |
| 9,967,109 B2 | 5/2018 | Nishimura et al. |
| 9,972,284 B2 | 5/2018 | Lee et al. |
| 10,062,257 B2 | 8/2018 | Chau |
| 10,085,571 B2 | 10/2018 | Schiffman et al. |
| 10,089,520 B2 | 10/2018 | Motukuri et al. |
| 10,089,952 B2 | 10/2018 | Nam et al. |
| 10,122,915 B2 | 11/2018 | Maayan et al. |
| 10,126,849 B2 | 11/2018 | Lee et al. |
| 10,169,677 B1 | 1/2019 | Ren et al. |
| 10,258,170 B2 | 4/2019 | Dunn et al. |
| 10,282,695 B1 | 5/2019 | McNamara et al. |
| 10,304,417 B2 | 5/2019 | Park et al. |
| 10,360,571 B2 | 7/2019 | Garel et al. |
| 10,419,647 B2 | 9/2019 | Park et al. |
| 10,477,162 B2 | 11/2019 | Jain et al. |
| 10,514,722 B1 | 12/2019 | Artwohl et al. |
| 10,575,660 B2 | 3/2020 | Artwohl et al. |
| 10,580,333 B2 | 3/2020 | Artwohl et al. |
| 10,674,569 B2 | 6/2020 | Luckhardt et al. |
| RE48,115 E | 7/2020 | Artwohl et al. |
| 10,838,453 B2 | 11/2020 | Artwohl et al. |
| 10,937,344 B2 | 3/2021 | Artwohl et al. |
| 11,047,614 B2 | 6/2021 | Kim et al. |
| 11,107,023 B2 | 8/2021 | Glasgow et al. |
| 11,141,004 B1 | 10/2021 | Rolek |
| RE49,103 E | 6/2022 | Artwohl et al. |
| 11,419,434 B1 | 8/2022 | Artwohl et al. |
| 11,435,777 B2 | 9/2022 | Artwohl et al. |
| 11,450,247 B2 | 9/2022 | Artwohl et al. |
| 2001/0010516 A1 | 8/2001 | Roh et al. |
| 2001/0052741 A1 | 12/2001 | Yun |
| 2002/0007486 A1 | 1/2002 | Yun |
| 2003/0038912 A1 | 2/2003 | Broer et al. |
| 2003/0117790 A1 | 6/2003 | Lee et al. |
| 2003/0154141 A1* | 8/2003 | Capazario ............ G06Q 10/087 705/26.1 |
| 2003/0205059 A1 | 11/2003 | Roche et al. |
| 2003/0207090 A1 | 11/2003 | Arora |
| 2003/0214619 A1 | 11/2003 | Masuda et al. |
| 2004/0073334 A1 | 4/2004 | Terranova |
| 2004/0093379 A1 | 5/2004 | Roh et al. |
| 2004/0144328 A1 | 7/2004 | Bonner et al. |
| 2004/0160388 A1 | 8/2004 | O'Keeffe |
| 2004/0194388 A1 | 10/2004 | Roche et al. |
| 2005/0068629 A1 | 3/2005 | Fernando et al. |
| 2005/0172654 A1 | 8/2005 | Rohrer et al. |
| 2005/0202178 A1 | 9/2005 | Roche et al. |
| 2005/0265019 A1 | 12/2005 | Sommers et al. |
| 2006/0103269 A1 | 5/2006 | Artwohl et al. |
| 2006/0127586 A1 | 6/2006 | Roche et al. |
| 2006/0145576 A1 | 7/2006 | Lee et al. |
| 2006/0158579 A1 | 7/2006 | Hasegawa |
| 2006/0174641 A1 | 8/2006 | Liu et al. |
| 2006/0192767 A1 | 8/2006 | Murakami |
| 2007/0003700 A1 | 1/2007 | Roche et al. |
| 2007/0016478 A1 | 1/2007 | Hill |
| 2007/0024822 A1 | 2/2007 | Cortenraad et al. |
| 2007/0058114 A1 | 3/2007 | Niiyama et al. |
| 2007/0076431 A1 | 4/2007 | Atarashi et al. |
| 2007/0151274 A1 | 7/2007 | Roche et al. |
| 2007/0162182 A1 | 7/2007 | Marti et al. |
| 2007/0171647 A1 | 7/2007 | Artwohl et al. |
| 2007/0193280 A1 | 8/2007 | Tuskiewicz et al. |
| 2007/0195535 A1 | 8/2007 | Artwohl et al. |
| 2007/0216657 A1 | 9/2007 | Konicek |
| 2008/0004950 A1 | 1/2008 | Huang et al. |
| 2008/0024047 A1 | 1/2008 | Juo et al. |
| 2008/0158858 A1 | 7/2008 | Madireddi et al. |
| 2009/0002990 A1 | 1/2009 | Becker et al. |
| 2009/0036208 A1 | 2/2009 | Pennington et al. |
| 2009/0052206 A1 | 2/2009 | Matsui et al. |
| 2009/0121970 A1 | 5/2009 | Ozbek |
| 2009/0146945 A1 | 6/2009 | Cho |
| 2009/0276319 A1 | 11/2009 | Lungu et al. |

(56) References Cited

U.S. PATENT DOCUMENTS

| | | |
|---|---|---|
| 2009/0295731 A1 | 12/2009 | Kim et al. |
| 2009/0306820 A1 | 12/2009 | Simmons et al. |
| 2009/0313125 A1 | 12/2009 | Roh et al. |
| 2010/0013925 A1 | 1/2010 | Fowler et al. |
| 2010/0026912 A1 | 2/2010 | Ho |
| 2010/0043293 A1 | 2/2010 | Nicholson et al. |
| 2010/0062152 A1 | 3/2010 | Roche et al. |
| 2010/0068398 A1 | 3/2010 | Roche et al. |
| 2010/0083672 A1 | 4/2010 | Yoon et al. |
| 2010/0119705 A1 | 5/2010 | Roche et al. |
| 2010/0152892 A1 | 6/2010 | Gavra et al. |
| 2010/0180615 A1 | 7/2010 | Linder et al. |
| 2010/0214786 A1 | 8/2010 | Nichol |
| 2010/0268792 A1 | 10/2010 | Butler et al. |
| 2010/0275477 A1 | 11/2010 | Kim |
| 2010/0293827 A1 | 11/2010 | Suss et al. |
| 2011/0022980 A1 | 1/2011 | Segal et al. |
| 2011/0083460 A1 | 4/2011 | Thomas et al. |
| 2011/0098849 A1 | 4/2011 | Hudis et al. |
| 2011/0116231 A1 | 5/2011 | Dunn et al. |
| 2011/0141011 A1 | 6/2011 | Lashina et al. |
| 2011/0150276 A1 | 6/2011 | Eckhoff et al. |
| 2011/0161160 A1 | 6/2011 | Carlson et al. |
| 2011/0173082 A1 | 7/2011 | Breitenbach et al. |
| 2011/0181792 A1 | 7/2011 | Hammonds |
| 2011/0191154 A1* | 8/2011 | Johnson ............. G06Q 30/0241 705/14.4 |
| 2012/0004769 A1 | 1/2012 | Hallenbeck et al. |
| 2012/0105424 A1 | 5/2012 | Lee et al. |
| 2012/0217254 A1 | 8/2012 | Cho et al. |
| 2012/0285089 A1 | 11/2012 | Artwohl et al. |
| 2012/0323620 A1* | 12/2012 | Hofman ............... G06Q 10/087 705/7.11 |
| 2013/0063326 A1 | 3/2013 | Riegel |
| 2013/0271696 A1 | 10/2013 | Dunn |
| 2013/0325638 A1 | 12/2013 | Auclair et al. |
| 2014/0078407 A1 | 3/2014 | Green et al. |
| 2014/0126829 A1 | 5/2014 | Seeley et al. |
| 2014/0129354 A1 | 5/2014 | Soon-Shiong |
| 2014/0129393 A1 | 5/2014 | Soon-Shiong |
| 2014/0214547 A1 | 7/2014 | Signorelli et al. |
| 2014/0232958 A1 | 8/2014 | Venturas et al. |
| 2014/0316561 A1 | 10/2014 | Tkachenko et al. |
| 2014/0344118 A1 | 11/2014 | Parpia et al. |
| 2015/0002660 A1 | 1/2015 | Lee |
| 2015/0073590 A1 | 3/2015 | Garcia Manchado et al. |
| 2015/0178654 A1 | 6/2015 | Glasgow et al. |
| 2015/0269593 A1 | 9/2015 | Le |
| 2016/0027231 A1 | 1/2016 | Guzzone et al. |
| 2016/0040469 A1 | 2/2016 | Lietz et al. |
| 2016/0047587 A1 | 2/2016 | Sasaki et al. |
| 2016/0138860 A1 | 5/2016 | Kang |
| 2016/0143459 A1 | 5/2016 | Clein |
| 2016/0220039 A1 | 8/2016 | Chang et al. |
| 2016/0350715 A1 | 12/2016 | Minvielle |
| 2017/0027339 A1 | 2/2017 | Chang et al. |
| 2017/0046991 A1 | 2/2017 | Riegel |
| 2017/0124603 A1 | 5/2017 | Olson |
| 2017/0147971 A1 | 5/2017 | Morse et al. |
| 2017/0213184 A1 | 7/2017 | Lee et al. |
| 2017/0228776 A1 | 8/2017 | Walden |
| 2017/0329078 A1 | 11/2017 | Dunn et al. |
| 2018/0020847 A1 | 1/2018 | Dunn et al. |
| 2018/0053226 A1 | 2/2018 | Hutton et al. |
| 2018/0061283 A1 | 3/2018 | Kim et al. |
| 2018/0103778 A1 | 4/2018 | Olovsson |
| 2018/0125404 A1 | 5/2018 | Bott et al. |
| 2018/0226056 A1 | 8/2018 | Chan |
| 2018/0268367 A1* | 9/2018 | Bryan ................. G06Q 10/0875 |
| 2018/0335252 A1* | 11/2018 | Oh ......................... G06V 20/52 |
| 2018/0365630 A1 | 12/2018 | Seals et al. |
| 2019/0050900 A1 | 2/2019 | Avakian |
| 2019/0122263 A1 | 4/2019 | Avakian |
| 2019/0149725 A1 | 5/2019 | Adato et al. |
| 2019/0156273 A1* | 5/2019 | Fisher ................. G06Q 10/087 |
| 2019/0213545 A1 | 7/2019 | Adato et al. |
| 2020/0286032 A1* | 9/2020 | Bogolea ............... G06Q 10/087 |

FOREIGN PATENT DOCUMENTS

| | | |
|---|---|---|
| DE | 10205405 A1 | 8/2003 |
| DE | 102009003127 A1 | 11/2010 |
| DE | 102015203150 A1 | 8/2016 |
| EP | 2194222 A2 | 6/2010 |
| EP | 2843336 A1 | 3/2015 |
| EP | 3379184 A1 | 9/2018 |
| EP | 3740103 A1 | 11/2020 |
| JP | 2001294308 A | 10/2001 |
| JP | 2003125904 A | 5/2003 |
| JP | 3450907 B2 | 9/2003 |
| JP | 2004183987 A | 7/2004 |
| JP | 2006209550 A | 8/2006 |
| JP | 2012161413 A | 8/2012 |
| JP | 2014206320 A | 10/2014 |
| JP | 2015169412 A | 9/2015 |
| JP | 2015222138 A | 12/2015 |
| JP | 2016533544 A | 10/2016 |
| JP | 2018151923 A | 9/2018 |
| KR | 20120044874 A | 5/2012 |
| KR | 20150093289 A | 8/2015 |
| KR | 20170033083 A | 3/2017 |
| WO | 9838547 A1 | 9/1998 |
| WO | 03025805 A1 | 3/2003 |
| WO | 2009152078 A1 | 12/2009 |
| WO | 2014165171 A2 | 10/2014 |
| WO | 2014175643 A1 | 10/2014 |
| WO | 2015095493 A1 | 6/2015 |
| WO | 2016183302 A1 | 11/2016 |
| WO | 2017127035 A1 | 7/2017 |
| WO | 2019032893 A1 | 2/2019 |

OTHER PUBLICATIONS

Jun. 3, 2021—(TW) Search Report Application No. 108146270.
Jul. 27, 2020—(TW) Search Report App 108146270.
Jul. 29, 2020—(TW) Office Action—App 108146270—Eng Tran.
Neff, J., "New System Puts Video Ads on Sotre Cooler Doors", (2015), AdAge, http://adage.com/article/cmo-strategy/system-puts-video-ads-store-cooler-doors/301395, pp. 1-3.
Jul. 1, 2020—U.S. Notice of Allowance—U.S. Appl. No. 16/222,643.
Nov. 19, 2020—(EP) Search Report—U.S. Appl. No. 18/843,780.
Jun. 1, 2021—(TW) Notice of Allowance App 108146270.
Jun. 3, 2021—(TW) Search Report App 108146270.
Jul. 28, 2021—(EP) Office Action—EP19900402.9.
Jul. 22, 2021—(KR) Office Action—10-2020-7006998.
May 26, 2022—(KR) Notice of Allowance App 10-2020-7006998.
Jun. 3, 2021—(WO) International Search Report and Written Opinion—App PCT/US2021/013247.
May 4, 2022—(WO) International Preliminary Examination Report (Chapter II)—App PCT/US2021/013247.
Advertising with Transparent LCD Displays; Jul. 28, 2016; URL: http://www.displays2go.com/Article/Advertising-Transparent-LCD-Displays-78>.
http://emotivev.com/products; at least as early as Jun. 5, 2017.
https://www.youtube.com/watchv=2tlM9IereLc; at least as early as Jun. 5, 2017, "Digital Signage Transparent LCD Beverage Cooler Demo".
Oct. 24, 2018—(WO) International Search Report and Written Opinion—App PCT/US2018/046103.
Extended EP Search Report for EP 12782036, dated Jun. 9, 2015, 7 Pages.
U.S. Notice of Allowance on U.S. Appl. No. 14/170,378, dated Mar. 31, 2015, 10 Pages.
File History of U.S. Appl. No. 16/547,288, filed Aug. 21, 2019.
File History of U.S. Appl. No. 15/888,210, filed Feb. 5, 2018.
File History of U.S. Appl. No. 14/819,257, filed Aug. 5, 2015, (U.S. Pat. No. 9,504,338).
File History of U.S. Appl. No. 14/686,958, filed Apr. 15, 2015, (U.S. Pat. No. 9,155,405).

(56) References Cited

OTHER PUBLICATIONS

File History of U.S. Appl. No. 14/170,378, filed Jan. 31, 2004, (U.S. Pat. No. 9,052,536).
File History of U.S. Appl. No. 13/286,053, filed Oct. 31, 2011, (U.S. Pat. No. 8,683,745).
File History of U.S. Appl. No. 61/484,616, filed May 10, 2011.
International Search Report of PCT/US19/66869 dated Mar. 16, 2020.
Written Opinion of PCT/US19/66869 dated Feb. 11, 2020.
Kamoda, Rena. "Monitoring Grocery Inventory in Refrigerators using Appearance and Load Balance Features." (2013). (Year: 2013).
Jul. 18, 2022—(EP) Search Report—App. No. EP19900402.9.
Jun. 1, 2022—(TW) Search Report App 110132225 w/ Eng. Trans.
Dec. 20, 2022—(U.S.) Non-Final Office Action—U.S. Appl. No. 16/741,581.
Oct. 28, 2022—(U.S.) Notice of Allowance—U.S. Appl. No. 16/763,448.
Feb. 22, 2023—(U.S.) Notice of Allowance—U.S. Appl. No. 16/763,448.
Oct. 12, 2022—(CA) Office Action—App 3,123,879.
Nov. 18, 2022—(EP) Office Action—App 18843780.0.
Jan. 13, 2023—(CN) Office Action—App 201880064016.5.
Jan. 31, 2023—(TW) Search Report—App 110132225.
Apr. 4, 2023—(U.S.) Notice of Allowance—U.S. Appl. No. 16/741,581.
Mar. 24, 2023—(U.S.) Notice of Allowance—U.S. Appl. No. 17/082,270.
Jul. 25, 2023—(CA) Office Action—App. No. 3,123,879.
Jul. 5, 2023—(CN) First Office Action—App 202180011384.5.
Jul. 6, 2023—(JP) Office Action—App. No. 2020-520519.

* cited by examiner

SMART MOVABLE CLOSURE SYSTEM FOR COOLING CABINET

CROSS-REFERENCE TO RELATED APPLICATIONS

This Application is a Continuation-in-part of application Ser. No. 16/741,581 filed on Jan. 13, 2020. Application Ser. No. 16/741,581 is a Continuation-in-part of Application PCT/US19/66869 filed on Dec. 17, 2019. This Application is related to application Ser. No. 16/222,643 filed on Dec. 17, 2018, application Ser. No. 15/674,198 filed on Aug. 10, 2017, and Application PCT/US18/46103 filed on Aug. 9, 2018. This Application is a Continuation-in-part of Application PCT/US19/66869 filed on Dec. 17, 2019. The entire contents of these applications are incorporated herein by reference in their entirety.

TECHNICAL FIELD

A smart, movable closure system that allows access to the interior from the exterior of the cabinet, is disclosed. In some embodiments, the movable structure may be coupled with a cabinet interior that is adapted to be kept at a temperature cooler than the exterior cabinet ambient temperature, for example, to store perishable consumer goods in a retail setting. In particular, the smart, movable closure system may include electronic components that display graphical renderings corresponding to one or more products stored in the retail product container.

BACKGROUND

Although more and more people are purchasing items online, brick and mortar retail sales (for example, provided through cooling systems) are still substantial and are, in fact, growing in certain market segments such as grocery, drug, and convenience stores. Over 75 percent of shopping in brick and mortar stores is impulse purchasing. Research shows that impulse decisions are highly influenced by in-store messaging, and that most of in-store impulse shopping occurs at retail product containers, such as coolers and freezers. Consequently, a disruption of impulse shopping behavior at a retail product container could present an enormous value creation opportunity for both consumer packaged goods brands and retailers.

SUMMARY

The following summary presents a simplified summary of certain features. The summary is not an extensive overview and is not intended to identify key or critical elements. A system of one or more computers may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions. One general aspect includes a smart, movable closure system configured for installation in a retail (or non-retail) environment requiring a cabinet (or other enclosure) adapted to be kept at a temperature cooler (or warmer) than an exterior cabinet ambient temperature. They system includes an internal storage volume of a retail product container storing perishable items for purchase in the retail environment, in some examples, where the movable door prohibits viewing of the internal storage volume. The system also includes a display device affixed to the movable door, where the display device is configured to display at least a planogram of the internal storage volume, where the planogram may include a message or graphic indicating out-of-stock of one or more products. The system may also include an optical sensor, such as a camera, installed on the movable door to capture one or more images of the internal storage volume of the retail product container. The system may also include a controller communicatively coupled to the display device. The system also includes a data store that may store an inputted planogram mapping of the internal storage volume and a description of a plurality of products, where the description may include shape, color, and/or dimension of one or more of the plurality of products. The system may also, in some examples, include one or more processors in a proximity of the retail product container. The system also includes a memory storing computer readable instructions that, when executed by the one or more processors, causes the one or more processors to perform one or more steps disclosed in this application. For example, the method steps may include to: post-process the one or more images captured by the optical sensor into a composite image; determine, based on the composite image, the inputted planogram mapping, and the description of the plurality of products, an inventory status of a product, among the plurality of products, in the retail product container; determine, based on the determined inventory status, an advertisement to be displayed on the display device, where the advertisement may include the out-of-stock indicator when the inventory status of the product is out of stock; and send, to the controller, the advertisement for display on the display device. One or more other steps (or different steps) may be performed by the aforementioned method being executed by the system. Other embodiments of this aspect include corresponding computer systems, apparatus, and computer programs recorded on one or more computer storage devices, each configured to perform the actions of the methods.

Some implementations may include one or more of the following features. The smart, movable closure system where the inputted planogram mapping may include: an indication of the product, and an indication of a specified location of the product. The determining the inventory status of the product may include determining, based on the composite image, that no product is detected at the specified location. In some examples, the optical sensor facing inwards may be configured to capture a plurality of images during operation of the movable door, where the operation may include opening of the movable door and closing of the movable door. The system may include an inventory tracker that, when executed by the one or more processors, causes the one or more processors to transmit, to a computing device, a message indicating that the product is not in the retail product container. The determining the inventory status of the product may include identifying, based on the composite image, a stored product in the retail product container, and further determining at least one selected from: a location of the stored product, a shape of the stored product, a color of the stored product, dimensions of the stored product, and combination thereof. The determining the inventory status of the product may include determining that the product is present in the retail product container based on at least one selected from: determining that the location of the stored product corresponds to the specified location; determining that the shape of the stored product corresponds to a shape of the product in the description;

determining that the color of the stored product corresponds to a color of the product in the description; determining that the dimensions of the stored product corresponds to dimensions of the product in the description; and combination thereof. The determining the inventory status of the product may include determining that another product is present at the specified location in the retail product container based on at least one selected from: determining that a shape of the another product does not correspond to a shape of the product in the description; determining that a color of the another product does not correspond to a color of the product in the description; or determining that dimensions of the another product does not correspond to dimensions of the product in the description. The determining the inventory status of the product may include determining a quantity of the product in the retail product container. The smart, movable closure system may include, receiving, from a computing device, the inputted planogram mapping. In some examples, the data store may be located in the retail environment, and the one or more images are captured based on operation (e.g., opening, closing, etc.) of the movable door. In some examples, the advertisement may include artwork associated with the product. The advertisement may include a planogram that may include artworks associated with the plurality of products. In some examples, the advertisement may include an artwork associated with a different product. Implementations of the described techniques may include hardware, a method or process, or computer software on a computer-accessible medium.

One general aspect includes a method for generating advertisement content on a display screen affixed to a movable door attached to a retail product container that may include an internal storage volume. The method may also include determining a planogram mapping of the internal storage volume and a description of a plurality of products, where the description may include shape, color, and/or dimension of each of the plurality of products. The method also includes post-processing one or more images captured by an optical sensor, which is installed on (e.g., on, in, or about) the movable door, into a composite image. The method also includes determining, based on (i) the composite image, (ii) the planogram mapping, and (iii) the description of the plurality of products, an inventory status of a product in the retail product container from among the plurality of products. The method may also include determining, based on the determined inventory status, an advertisement to be displayed on the display screen. The method also includes sending the advertisement for display on the display screen. Other embodiments of this aspect include corresponding computer systems, apparatus, and computer programs recorded on one or more computer storage devices, each configured to perform the actions of the methods.

One general aspect also includes a computer platform of a cooling system that may include a retail product container with an internal storage volume. The computer platform also includes one or more processors. The platform also includes a memory storing computer-executable instructions that, when executed by the one or more processors, causes the one or more processors to: determine a planogram mapping of the internal storage volume and a description of a plurality of products, where the description may include shape, color, and/or dimension of each of the plurality of products; post-process one or more images captured by an optical sensor, installed on the movable door, into a composite image; and determine, based on the composite image, the inputted planogram mapping, and the description of the plurality of products, an inventory status of a product, among the plurality of products, in the retail product container; determine, based on the determined inventory status, an advertisement to be displayed on the display screen; and sending the advertisement for display on the display screen. Other embodiments of this aspect include corresponding computer systems, apparatus, and computer programs recorded on one or more computer storage devices, each configured to perform the actions of the methods.

Implementations may include one or more of the following features. The computing platform of a cooling system may comprise a retail product container with an internal storage volume, a movable door blocking a view of the internal storage volume, a display affixed to the movable door, and an optical sensor affixed on the movable door. In some examples, the display is configured to display at least a planogram of the internal storage volume. The planogram mapping may include one or more of: an indication of the product; and/or an indication of a specified location of the product. The determining the inventory status of the product may include one or more of: calculating a confidence score based on the composite image and the description of the plurality of products; and/or determining that the product is out-of-stock in the internal storage volume when the confidence score is below a threshold value. Implementations of the described techniques may include hardware, a method or process, or computer software on a computer-accessible medium. These and other features and advantages are described in more detail below.

BRIEF DESCRIPTION OF THE DRAWINGS

The foregoing summary, as well as the following detailed description of exemplary embodiments, is better understood when read in conjunction with the accompanying drawings, which are included by way of example, and not by way of limitation with regard to the claimed invention.

FIG. 5A shows a cross section of a portion of a door of a retail product container, and FIG. 5B shows a portion of a door of a retail product container in accordance with an embodiment.

DETAILED DESCRIPTION

Figure 1A:
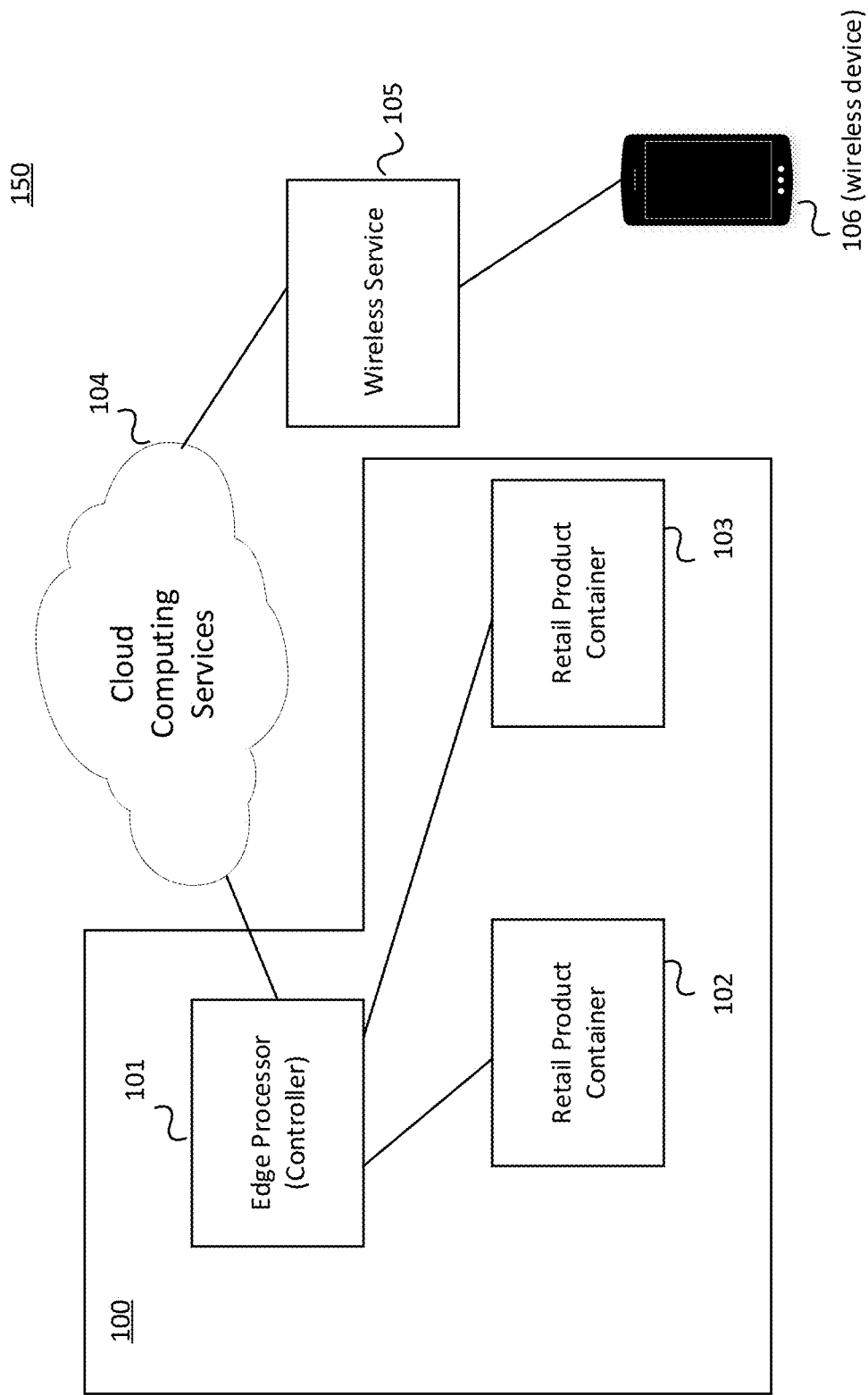
FIG. 1A, FIG. 1B, and FIG. 1C (collectively referred to as "FIG. 1") show embodiments of a computing platform supporting one or more retail product containers in accordance with one or more embodiments.

According to an aspect of some of the embodiments, a smart, movable closure system is disclosed. The system may, in some embodiments, comprise electronic components that capture images and/or other media (e.g., audio, video, infrared data, or other media) of the interior of a cabinet or the exterior of the cabinet. Moreover, the system may also, in some embodiments, comprise electronic components that display, among other things, graphical renderings or other visual output corresponding to one or more products stored in cabinet. The cabinet may be adapted to be kept at a temperature cooler than the exterior cabinet ambient temperature, for example, to store perishable consumer goods in a retail setting. As such, the retail product container may provide a system that interfaces with users in a retail environment.

A computing platform generates displayed content at a retail product container of a cooling system based on information about a customer in proximity to the retail product container, one or more products stocked at the retail product container, and generalized information external to the retail product container. According to an aspect of some embodiments, the computing platform may generate selected advertisements (ads) at one or more retail product container. The retail product container includes an internal storage volume for stocking one or more products, a display on the container's door, and a customer detector to detect the presence of a customer in proximity to the retail product container. With an embodiment, when a customer is detected to be located within a predetermined distance from the retail product container, an invitation indicator is displayed on the container's display. When the customer opts-in, a personalized advertisement may be displayed in accordance with customer information that may be obtained through a mobile app. The personalized advertisement may also include customized pricing for one or more products stocked at the retail product container. With an embodiment, a displayed advertisement may be based on an inventory status of products stocked in the retail product container. For example, the container's display may display an out-of-stock indicator based on detecting that a product is no longer available in the container.

Coolers may be one of the most overlooked, least promoted, least technology sophisticated, and may be one of the most operationally challenged sections of a retail store. Conventional retail product containers (e.g., coolers, freezers, vending machines, etc.) may comprise a glass panel or door through which a customer can view products stored in the retail product container and which can be available for purchase. However, stored products may not be neatly presented, and stored products may be blocked by other products, such that a customer cannot easily see what products are available for purchase. Still further, store employees may often be required to maintain the appearance of the products stored therein, keep track of stock, or install and swap out promotional tags and other displays (such as displays relating to pricing and promotions) in order to keep those items current.

With these traditional approaches to retail product containers described above, coolers and refrigerators in grocery stores may be an area that is difficult for brands to conduct effective "on-the-spot" advertisements and promotions. Brands may typically rely on other advertising medias (for example, print, billboards, online and TV advertisements, and so forth) to promote products that are retailed on the shelves of coolers/freezers and/or refrigerators at retail and convenience stores.

Furthermore, with these traditional approaches described above, advertising efforts may not be as effective and impactful. Due to the limitations of traditional approaches, market penetration has been very small.

FIG. 1 shows computing platform 100 supporting one or more retail product containers in accordance with an embodiment. Computing platform 100, comprising controller 101 and retail product containers 102 and 103, may generate a selected advertisement at one of retail product containers based on stored products at the retail product container.

Retail product containers 102 and 103 may comprise a cooler, freezer, vending machine, and so forth and typically store different types of products (for example, milk, frozen meals, beer, ice cream, and so forth) in corresponding internal volumes.

Referring to FIG. 1A, in one embodiment of the system disclosed herein, edge processor (controller) 101 instructs retail product container 102 or 103 to display the selected advertisement based on one or more criteria, for example, a customer in proximity to the retail product container, products stocked at the retail product container, and generalized information (for example, weather conditions) that are not specific to the retail product container. Meanwhile, other embodiments of the system disclosed herein operate/function without any knowledge of the individual shopper/customer, and the system never seeks to identify individuals—i.e., it is "identity-blind" in that it never gathers or uses personally identifiable or linkable information. In some embodiments, selection of whether to execute an "identity-blind" set of features or otherwise may be determined on whether the system is located in a country or state where consumers desire privacy and/or applicable laws govern.

Figure 1B:
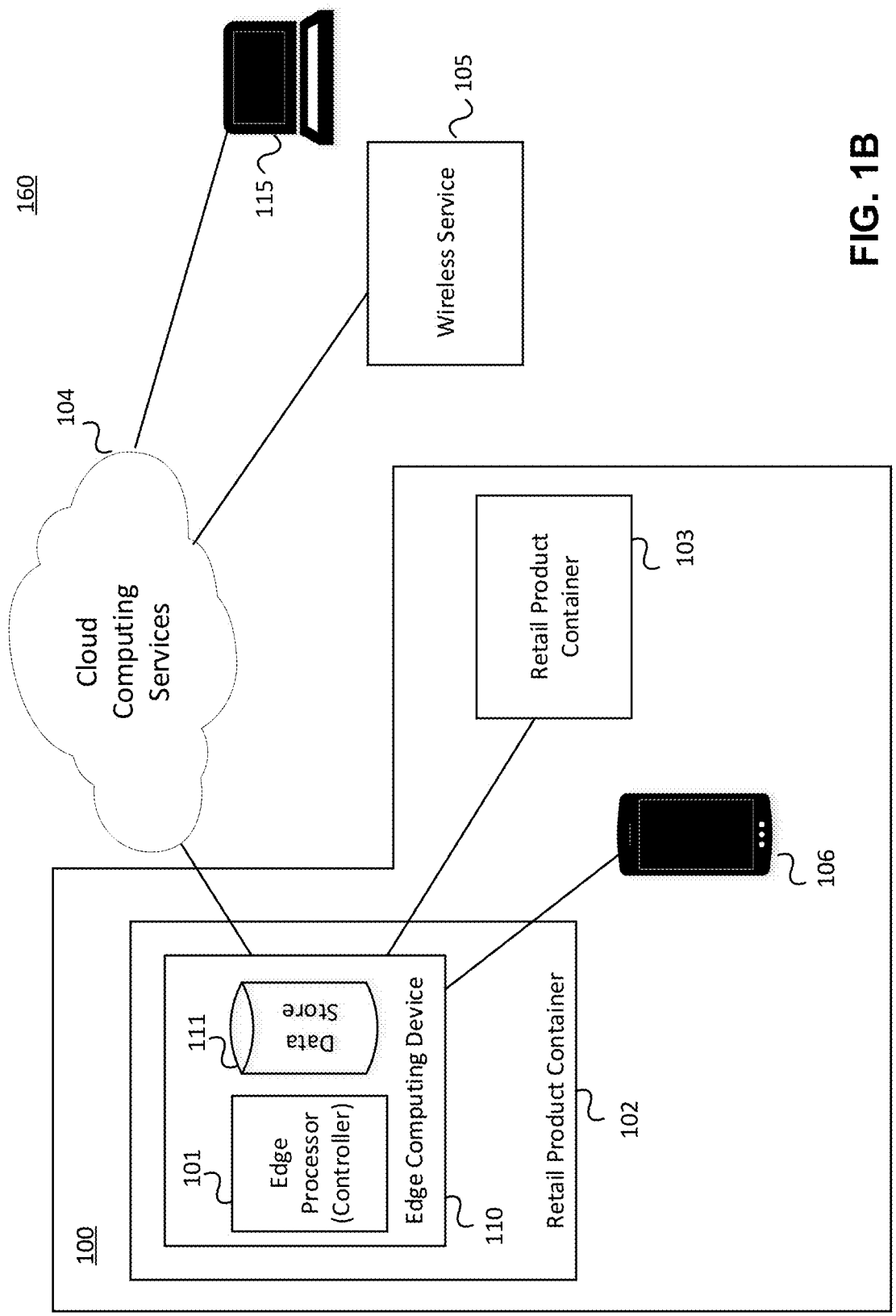

Referring to FIG. 1, with some embodiments, controller 101 may communicate with retail product container via a wired or wireless communication channel (for example, Wi-Fi, Bluetooth®, Zigbee®, and so forth) and may be near the retail product container or at any place in the world through the Internet. As illustrated in FIG. 1B, in some embodiments, the controller 101 may be built-into/integrated into an edge computing device 110 in a retail product container. Of course, the computing platform 100 may include one or more routers (e.g., wireless routers) to communicatively connect one or more edge processors 101 corresponding to retail product containers 102, 103 with cloud computing services 104. In one system 150, a wireless router (not shown in FIG. 1A) may be used to connect the edge processor 101 with a cloud computing services 104; the wireless router may provide a shared, wireless network for a plurality of Internet of Things (IoT) devices at a retail location, including retail product containers 102, 103. In another example involving system 160 in FIG. 1B, an edge computing device 110 may comprise wireless hardware (e.g., LTE/5G or other cellular standard) to connect with cloud computing services 104 without the use of a shared wireless router and/or modem operated by a retail owner; the edge computing device 110 may also comprise an edge processor 101 and a data store 111.

Each retail product container 102 or 103 may support a wireless channel through a common communication interface for associated components (for example, sensors, cameras, and so forth) that is not explicitly shown. However, some embodiments may establish separate wireless communication channels for each of the different components supporting the Internet of Things (IoT) with controller 101. In some examples, the retail product containers 102, 103 may share an edge computing device 110 to reduce the cost and complexity of the retail product container 103. In such an example, as illustrated in FIG. 1B, an edge computing device 110 in a first retail product container 102 may take responsibility for handling one or more of the computing steps described in this document. Thus, a second retail product container 103 may distribute the computing load related to determination of a product being out-of-stock to the edge computing device 110 in the first retail product container 102.

With some embodiments, controller 101 may interact with additional computing facilities, for example, cloud computing services 104 or one or more computer servers (not explicitly shown) to obtain advertisement content and to interact with a customer or an employee via wireless device 106 through wireless service 105. Alternatively, the wireless device 106 may connect with the edge processor 101 directly through a shared wireless router (not shown in FIG. 1) at the retail location. FIG. 1B illustrates another architecture of the computing platform 100 in which the wireless device 106 may be a tablet, smartphone, laptop, or other mobile electronic device that communicatively connects using a short-range wireless communication channel (for example, Wi-Fi, Bluetooth®, Zigbee®, and so forth) with an edge computing device 110 residing in or near a retail product container 102, 103.

Figure 1C:
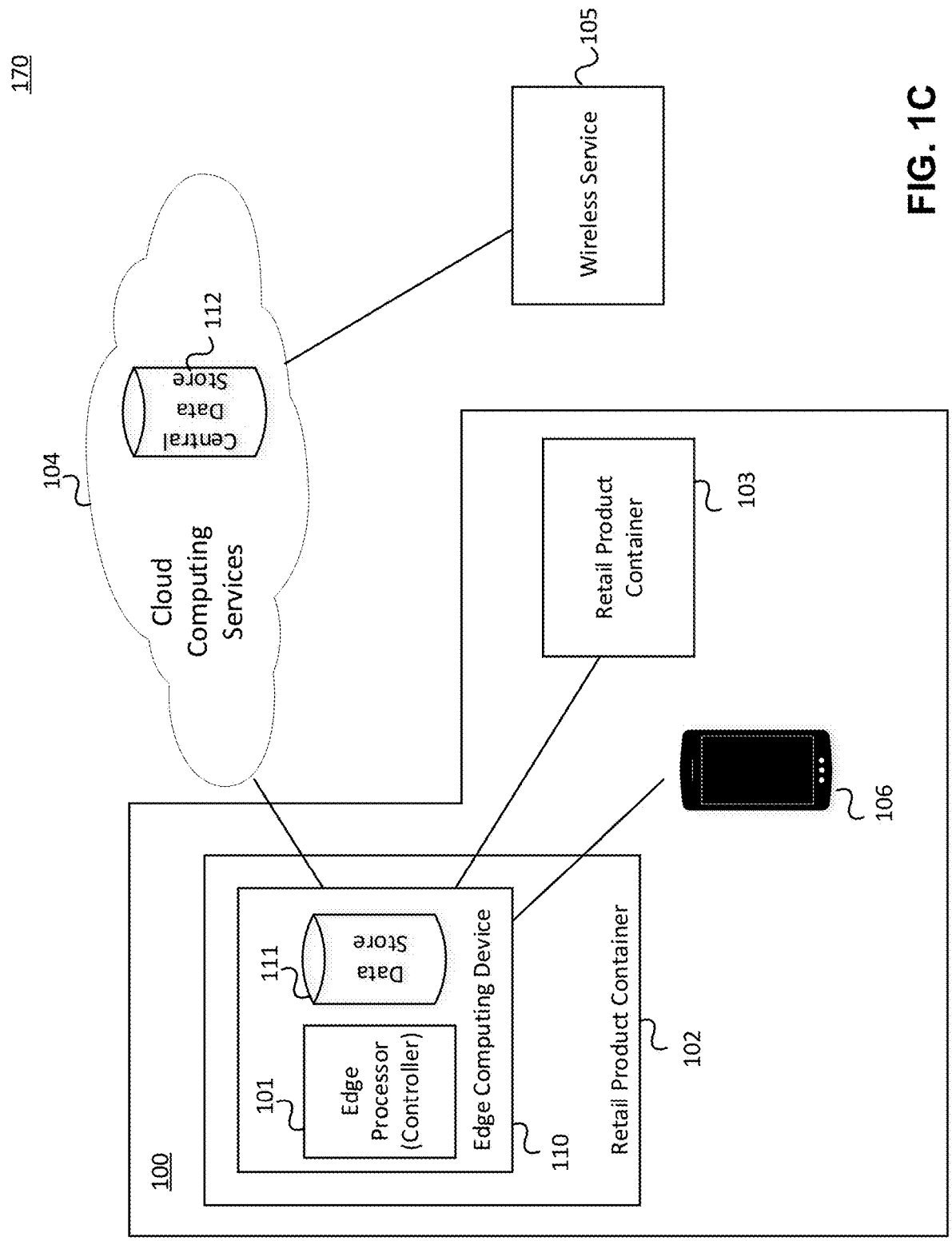

With some embodiments, as illustrated in FIG. 1B, the edge computing device 110 may communicate (e.g., via cloud computing services 104) with another computing device 115. The computing device 115 may be associated with an expert user and may be used to control and monitor operation of the edge computing device 110. As illustrated in FIG. 1C, in some embodiments, the cloud computing services 104 may comprise a central data store 112, which is further described herein in relation to FIG. 9.

Figure 2:
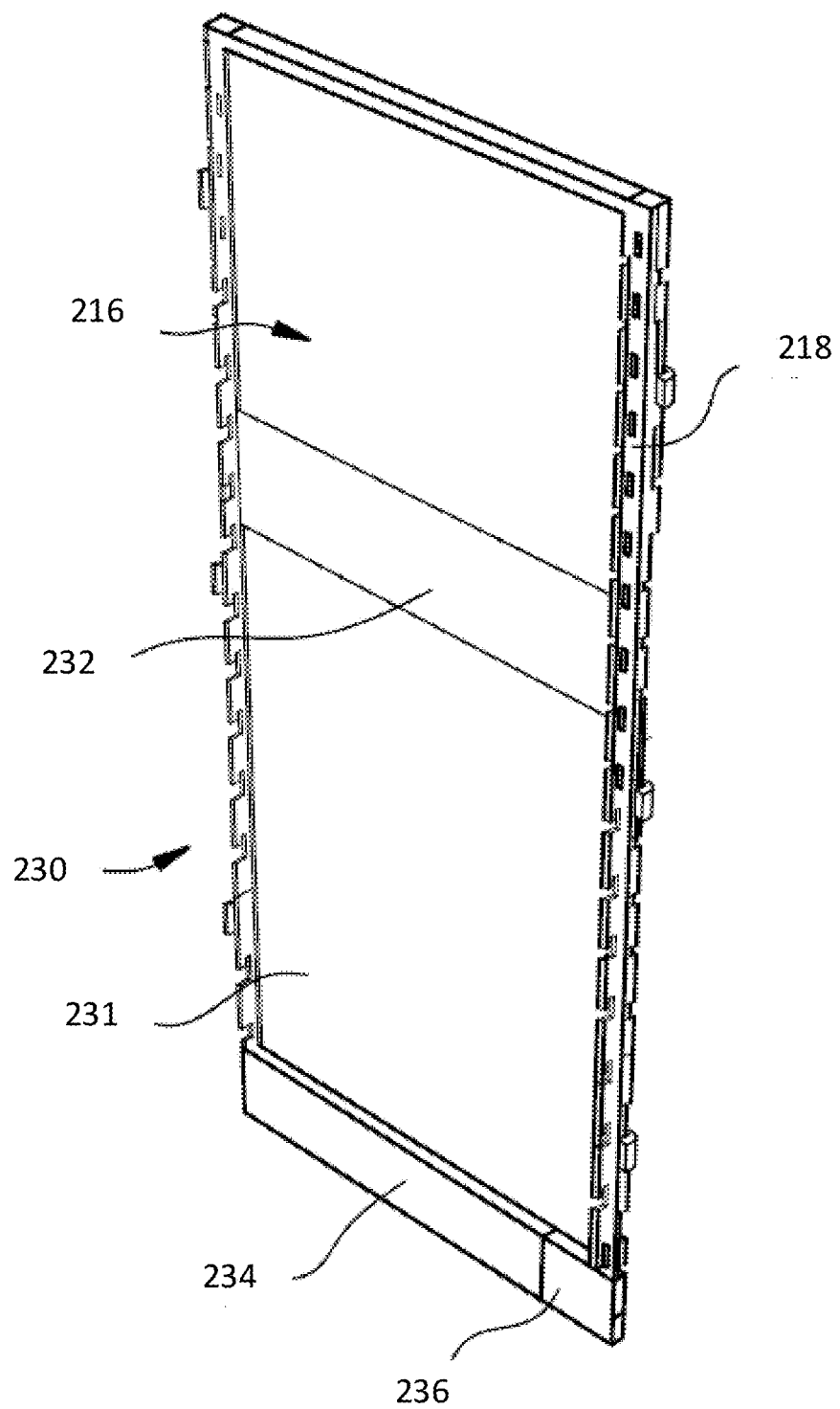
FIG. 2 shows a front of a door of a retail product container in accordance with an embodiment.

FIG. 2 shows a front view 231 of door 230 of a retail product container (for example, containers 102 and 103 as shown in FIG. 1) in accordance with an embodiment.

Each retail product container 102 and 103 may have door 230. Display (screen) 216 is mounted on door 230 along with customer-detecting hardware 218, such as one or more proximity sensors (heat maps), image sensors, sensors or scanners that detect human form/features, and eye-sensors (iris-tracking sensors).

With some embodiments, display 216 comprises an LCD panel having one or more touch zones 232 which are interactive by the customer. Access panel 234 may be situated proximate to the bottom of the door 230 along with a media player 236, which provides display content to display 216. A protective panel (not explicitly shown) may be mounted over the display 216.

Figure 3:
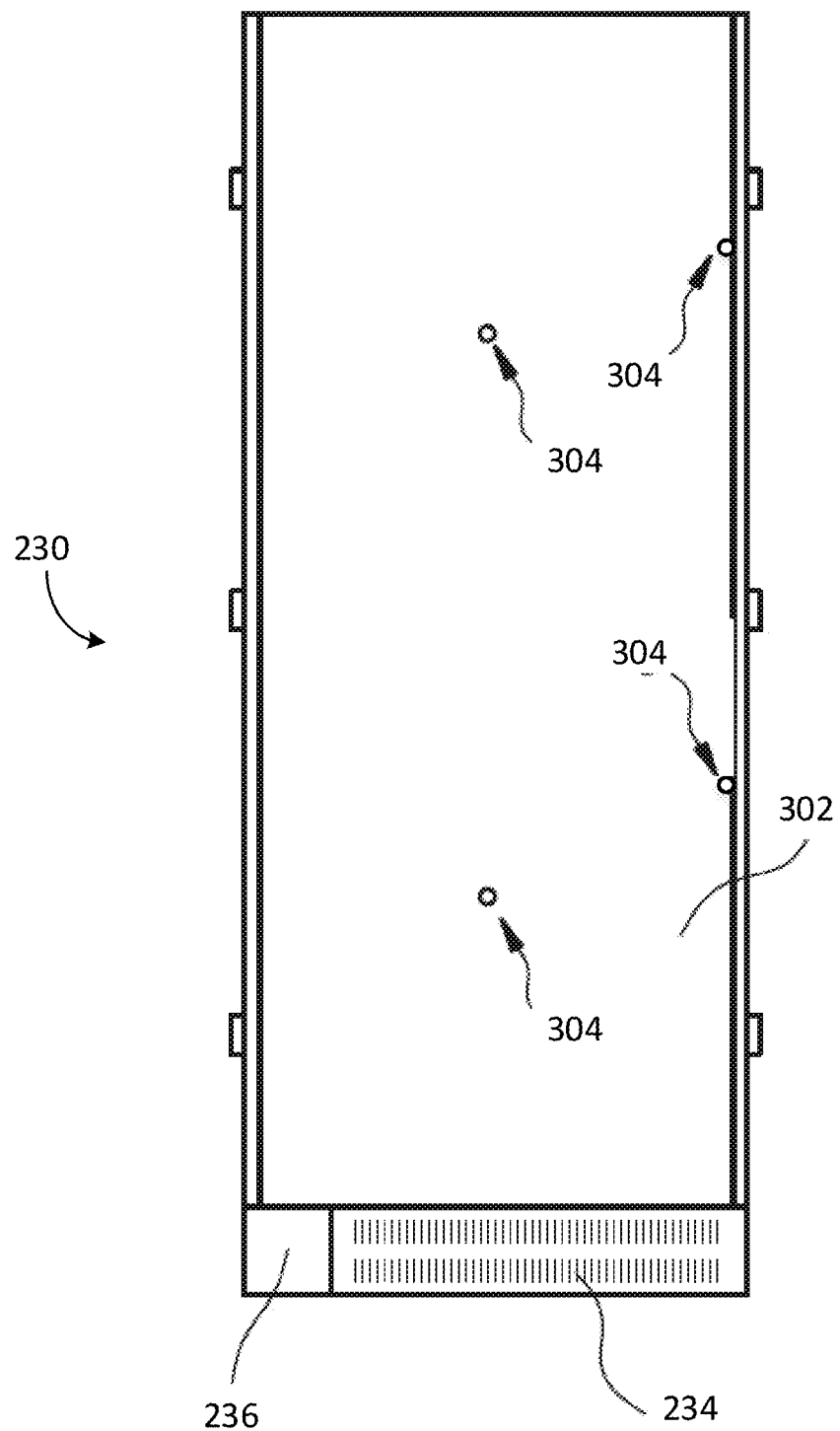
FIG. 3 shows a back of a door of a retail product container in accordance with an embodiment.

FIG. 3 shows a rear view 302 of the door 230 of the retail product container in accordance with an embodiment. Cameras or other types of sensors (i.e. inventory-taking hardware 304) may be provided on the back 302 of the door 230 and may face products stored in the retail product container. The inventory taking hardware 304 may be used by the controller 101 to keep track an inventory status of products in a retail product container.

Figure 4:
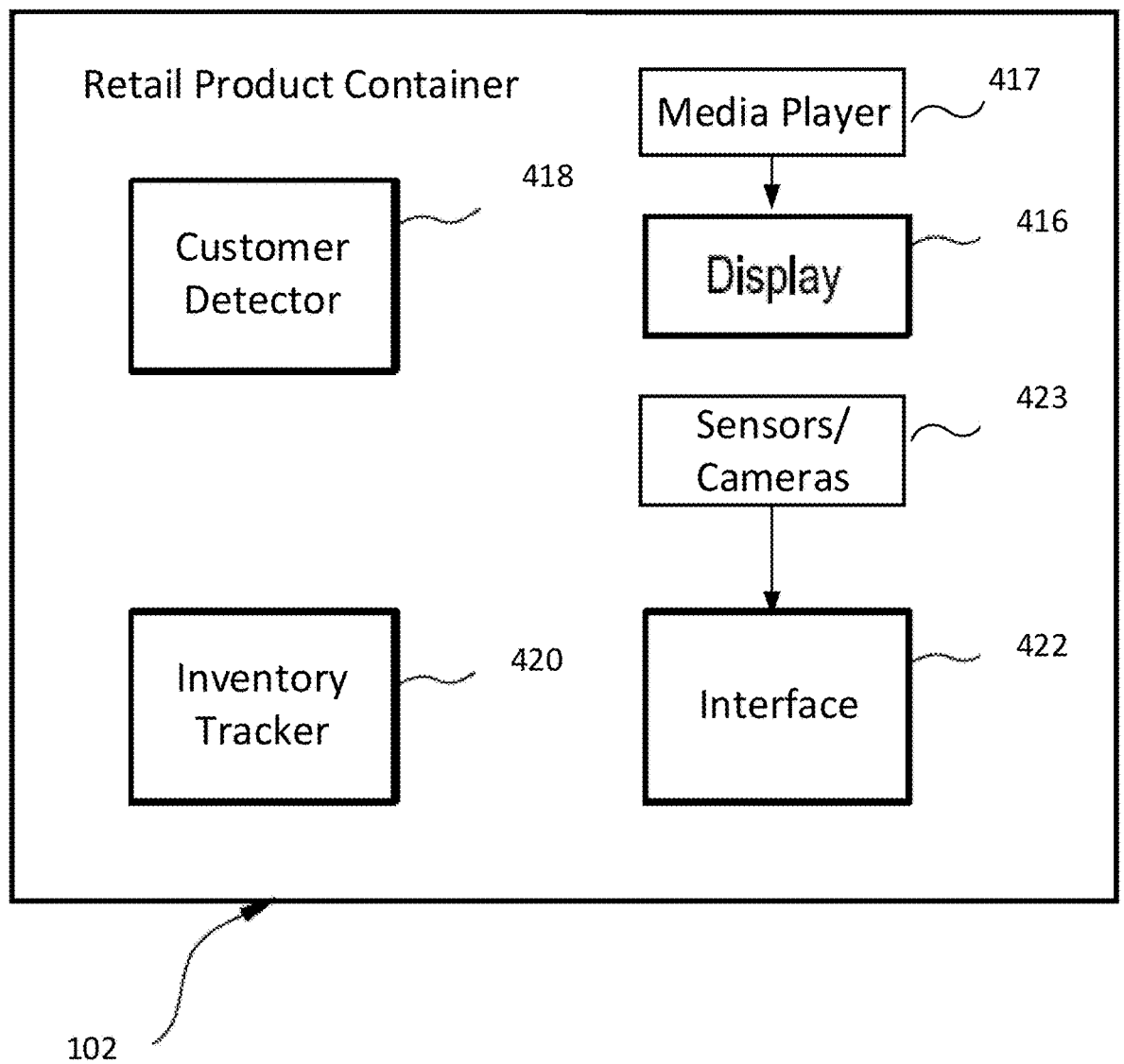
FIG. 4 shows a retail product container in accordance with an embodiment.

FIG. 4 shows retail product container 102 in accordance with an embodiment. Each retail product container 102 comprises at least one display 416, such as a display on a door of retail product container 102.

A plurality of retail product containers (similar to retail product container 102) and associated displays may be arranged side-by-side down an aisle of a retail store (for example, a grocery store). Edge processor (controller) 101 (as shown in FIG. 1) may be configured to operate the display 416 depending on what is detected, e.g., by the customer detector 418 and/or the inventory tracker 420.

With some embodiments, customer detector 418 may detect a customer when the detected object is deemed to be a human (person) (rather than, for example, a shopping cart). Customer detector 418 may further determine whether the detected person is an employee (for example, by a uniform of the employee or by a RFID tag on the employee). In such a situation, customer detector 418 may ignore the employee so that a display at a retail product container is not updated.

With some embodiments, display 416 comprises a non-transparent display which prohibits customers from viewing, through the display, products stored in the internal storage volume. Display 416 may comprise, for example, a touchscreen with which customers may interact. The display 416 may be associated with a display controller.

Each retail product container 102 may further comprise customer detector 418 that may detect any or specific individuals (e.g., customers versus employees), motion (e.g., of a customer), a human form (e.g., a human-shaped form or generic face of a customer), heat, etc. (For example, customers may be individuals in the vicinity of a retail product container as detected by customer detector 418.) With some embodiments, the customer detector may utilize one or more of a proximity sensor (e.g., via a heat map), an image sensor, a sensor that detects human form/features, a scanner, an eye-sensor (e.g., an iris-tracking sensor), etc. In addition to customer detector 418, the retail product container 102 may comprise other sensors 423 configured to detect activity in/around/on the retail product container 102. Although for illustrative purposes customer detector 418 has been described as an input to trigger/activate further steps (e.g., in FIG. 8, refs. 802 and 804), the customer detector 418 may be substituted with and/or supplemented with one or more other sensors 423, including but not limited to the following examples: a sensor configured to detect an open door; a sensor configured to detect movement of the door from one position to another (e.g., from closed to open, or from open to closed, whether the door was slammed closed, the angular speed of the movement of the door, and the like); a weight sensor on a shelf in the retail product container 102 to detect a change in inventory; an optical sensor (e.g., a camera) configured to detect out-of-stock products in the retail product container 102; and/or other kinds of sensor/camera operations.

With some embodiments, one or more image sensors 423 may be mounted on doors of retail product container 102. The one or more image sensors may have a depth of field of view of twenty feet or more and may have a range of field of view of 170 degrees with, for example, 150 degrees of detection capabilities. For example, the detection capabilities may detect if an overall shape or generic features of a human/person are in the proximity of the retail product container 102. Computer-readable instructions may be employed in association with the image sensors to monitor shopper interactions, provide relevant advertisement content on the display 416 via media player 417, and track advertisement engagement in-store. Controller 101 (as shown in FIG. 1) may be configured to independently control each image sensors, as well as collectively control a plurality of displays to provide single-screen and/or multiple screen content and interactions. Controller 101 and display 416 may be configured to allow for both banner advertisements 402 and full-screen advertisements 401 to be displayed on display 416. The controller 101 may provide advertisement content to the display controller for output at the display 416.

Each retail product container 102 may further comprise inventory tracker 420, e.g., to identify, quantify, and/or otherwise track stored retail products. In some aspects, the inventory tracker 420 may utilize additional cameras and/or sensors 423 that may be disposed inside retail product container 102 and face the stored products. In some aspects, the inventory tracker 420 may comprise processors, memory, and/or computer-readable instructions for post-processing images and/or other data captured by the cameras and/or sensors. In some aspects, the processors and/or computer-readable instructions may be integrated with the controller 101, and the controller 101 may perform post-processing and analysis of images/data to identify, quantify, and/or otherwise track the stored retail products.

Figure 8:
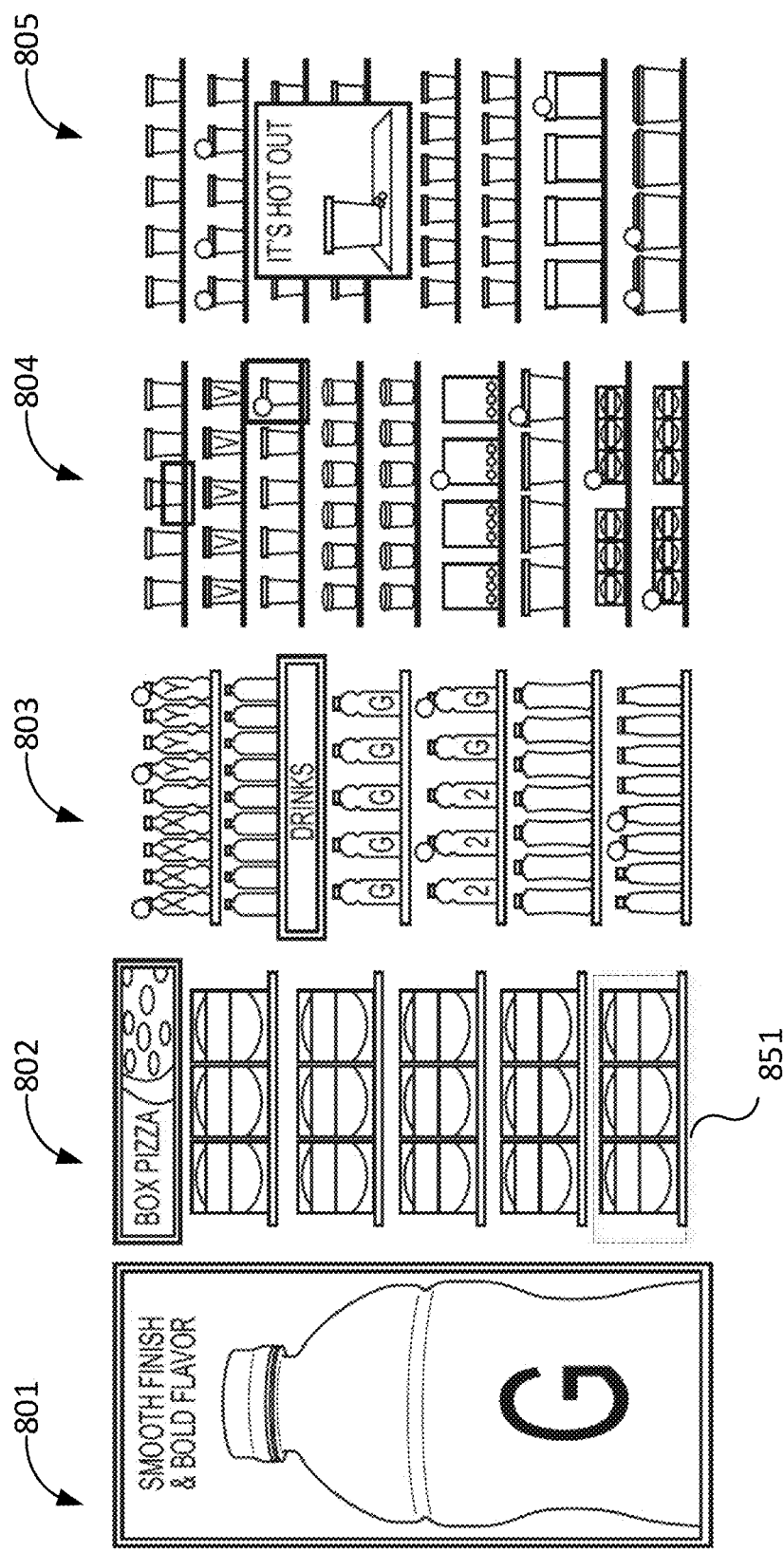
FIG. 8 shows different types of advertisements that can be displayed on a display screen of a retail product container in accordance with an embodiment.

Controller 101 may be configured to control the display 416 of each retail product container 102 to provide a planogram (for example, as shown in advertisements 801-805 in FIG. 8). In some aspects, the planogram may relate to retail products physically contained in the internal storage volume of retail product container 102. The retail products may not necessarily be viewable through the display 416. For example, products stored in the retail product container 102 may not be neatly arranged or may be blocked from view by other products stored therein. However, the planogram may indicate (e.g., to a customer) the retail products stored within the internal storage volume, based on inventory information provided by inventory tracker 420. Consequently, the displayed planogram may effectively optimize what is presented to the customer.

As shown in FIG. 1, controller 101 may be networked with retail product container 102 through the Internet, Bluetooth, and so forth via wired Ethernet, wireless LAN, a cellular network, and the like. Controller 101 may be configured to control the display 416 of retail product container 102 as well as may be configured to receive information from retail product container 102, including information from the display 416 (for example, information regarding touchscreen interactions) as well as information from the customer detector 418 and inventory tracker 420.

Each retail product container 102 may also include interface 422 that may be configured to facilitate, among other things, the networking and transfer of information between the controller 101 and retail product container 102 and control of display 416, customer detector 418, and inventory tracker 420.

With some embodiments, controller 101 may comprise a server having one or more processors, memory storage, a user interface, and so forth and may be configured to instruct what is displayed on the display 416 and to receive information and data from the retail product container 102. Additionally, the controller 101 may be configured to perform analytics based on the received information and data.

While not explicitly shown in FIG. 4, embodiments of retail product container 102 may include other components (for example, a refrigeration unit and so forth) needed for physically storing products within its internal volume.

An embodiment of the present invention provides an automated ability to detect the inventory of products placed inside the retail product container 102 and update the planograms that are indicating the products on the display 416. The inventory tracker 420 may utilize cameras, pointed to take pictures of the interior shelves of the retail product container 102, in conjunction with software that utilizes smart algorithms to conduct image analysis and subsequent analytics. For example, the inventory tracker 420 may determine whether a product is in the retail product container 102, a quantity of the product in the retail product container 102, whether the product is in a correct location in the retail product container 102, etc. For example, if any item is not in the retail product container 102, the controller 101 is configured to detect and update the information on the display 416 to guide the consumers and store operators.

Figure 5A:
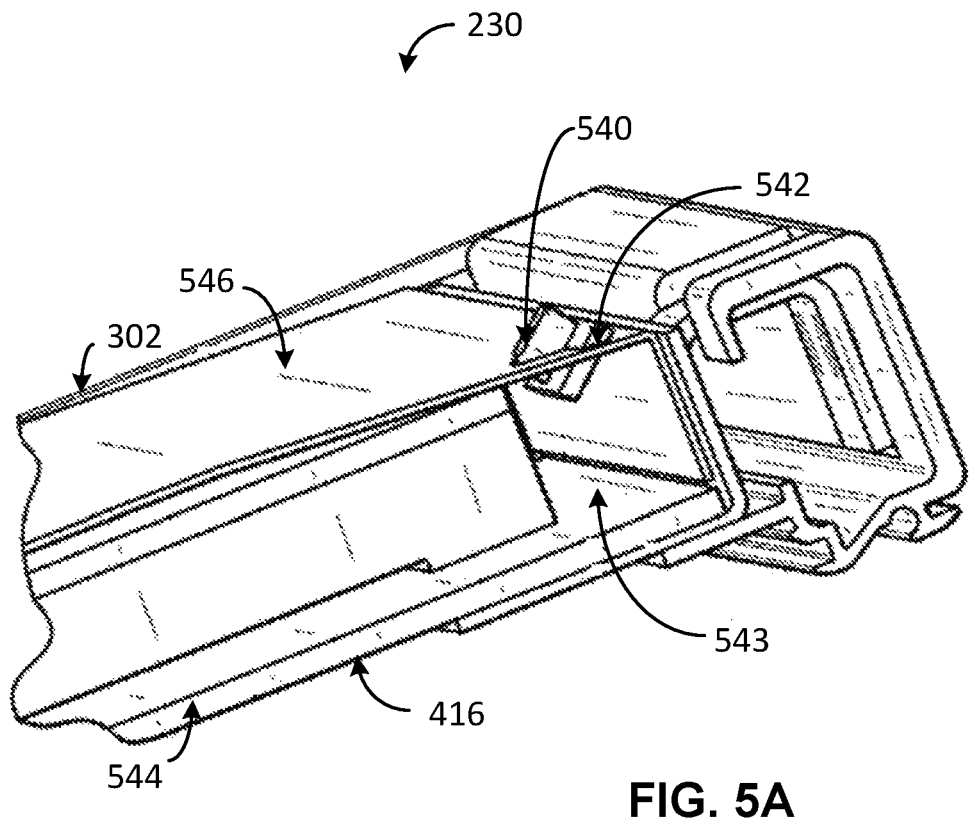
FIG. 5A and FIG. 5B (collectively referred to as "FIG. 5") show portions of a door in a retail product container in accordance with one or more embodiments; specifically.
Figure 5B:
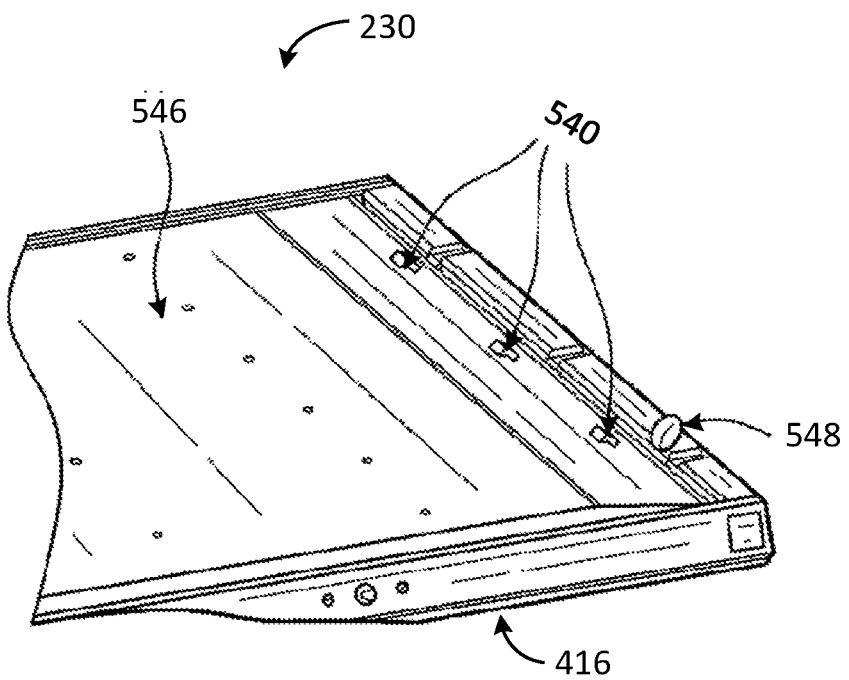

FIGS. 5A and 5B show example placements of one or more cameras 540 in the door 230 of the retail product container 102. The cameras 540 may be mounted on the edge of the back 302 of the door 230, and may be housed on brackets 542 that are tilted at an angle to enable taking pictures when the door 230 is swung open.

In an example, wide field of view (FOV) cameras (e.g. 180° FOV ("fisheye")) may be utilized because they provide large area coverage. Images generated by wide field of view cameras may get severely distorted on the edges and limit the software's capability to "recognize" the images in the image processing step. In an example, miniature cameras with 120° FOV may be mounted on 45° angled housings along the edge on the handle side of the door 230. As shown in FIG. 5A, the camera 540 may be housed within an empty bezel space 543 between a display panel assembly 544 and a mechanical frame 546 of the door 230.

Any number of cameras 540 can be provided on the inside of each door of each retail product container 102. For example, as shown in FIG. 5B, three cameras 540 may be distributed at an equal distance along the height of the door 230 to allow for complete height and width coverage of the shelf space (i.e., inside the retail product container 14). The three cameras may capture the entirety of a shelf of a retail product container when the door 230 is open at any angle larger than about 25°. In some other examples, the type of cameras used and/or specifications of the cameras may result in the angle being greater or less than 25°.

The cameras 540 may get triggered and capture images during door operation (i.e., when the door 230 is opened). The cameras 540 may get triggered in response one or more events. For example, the cameras 540 may get triggered based on sensing a motion. At least one of the cameras 540 may be used to sense the motion. Additionally, or alternatively, one or more accelerometers 548 (see FIG. 5B) on the door 230 may be used to sense a motion of the door. For example, the one or more accelerometers 548 may sense that the door is closing and trigger the cameras 540. The cameras 540 may get triggered depending on a swing state and a position of the door 230. For example, the cameras 540 may get triggered when the door 230 is open.

The cameras 540 may get triggered when the door 230 is being closed. This may enable the inventory tracker 420 to generate an accurate assessment of inventory of products in at least some example situations. For example, if the retail product container 102 has a single bottle of a particular soft drink, the display 416 may display a planogram including the soft drink. If a consumer opens the door 230 and removes the retail product container 102 and closes the door 230, the inventory tracker 420 may update a record associated with the soft drink and then display 416 may be updated to indicate (e.g., on the planogram) that the soft drink is now out of stock at the retail product container 102. Capturing an image when the door 230 is being closed, in some embodiments, may enable the inventory tracker 420 to accurately update product inventory following the consumer accessing the retail product container 102.

A plurality of images may be captured during door operation. For example, a single camera 540 may capture the plurality of images. For example, when three cameras 540 are used, a first photo may be captured by a first camera, a second photo may be captured by a second camera, a third photo may be captured by a third camera. Alternatively, each of the three cameras 540 may capture a plurality of images. This may enable capturing images from different positions/angles with respect to the internal contents of the retail product container.

Furthermore, in other examples, motion video cameras may be used. The motion video cameras may capture multiple video frames from a start position to a predefined end position of the rotation of the door. The end position may be a set predefined position, a predefined range, or a predefined relative rotation angle from the start position.

A controller (e.g., the inventory tracker 420 and/or the controller 101) may adjust operation parameters of the cameras 540 based on various factors. The controller may adjust exposure, focus position, sensor gain/ISO speed, aperture size, etc., of the cameras 540. In one example, the controller may change the frequency of image capture based on a rotational speed of the door. For example, the controller may increase the number of images captured if the controller receives measurements (e.g., the one or more accelerometers 548, or other motion sensors) that the door is swinging at a higher rotational speed. In low light situations, the controller may adjust the operating parameters of the one or more cameras to accommodate the low light. In other examples, the controller may detect moisture or condensation on a camera lens and modify the operation parameters of affected cameras.

The controller may perform post-processing on the captured image(s). The controller may execute computer-executable instructions to digitally combine/stitch the plurality of images into a single composite image. For example, the controller may combine multiple photos from the first camera with one or more photos taken by the second camera and third camera into a single composite image. In some embodiments, the composite image may undergo post-processing to reduce image size. In one example, artificial intelligence using a neural network, such as a convolutional neural network, may be used to identify a boundary edge of the pertinent portions of the contents of the retail product container. Areas of the image outside of the boundary edge may be discarded by the controller. The area outside of the boundary edge may correspond to locations that are outside the internal storage volume of the retail product container 102. A smaller image size may reduce memory requirements at the controller and may also reduce bandwidth required to transmit the image from the controller to one or more remote servers in the cloud.

In some embodiments, the captured image(s) may undergo post-processing to reduce blurriness. A blurriness mitigation module in the controller may identify portions of captured images that are duplicative and select appropriate portions, from those duplicate portions, where the blurriness (and/or other undesirable image characteristics) are reduced. The controller may generate the composite image by digitally combining/stitching the selected portions as identified by the blurriness mitigation module.

As shown in FIG. 5A, the camera 540 may be positioned such that a rotation of the camera 540 may result in the camera 540 protruding past the edge of the display panel assembly 544. At least one benefit of such positioning is that the camera's view might not be obstructed. In some embodiments, this consideration may result in the location of the camera 540 to be about 28" from the hinge axis. Meanwhile, in other embodiments, the camera 540 may be located at other distances from the hinge axis.

In one illustrative embodiment, a camera to shelf distance may be 4", and the retail products on the shelves may be generally centered relative to the door frame. The camera may have about 120° diagonal FOV and may be oriented such that the view is wider in the direction of the camera's skinny dimension. The camera may be positioned near the handle side of the door with a 45° tilt towards the hinge side without having its view blocked by the display screen inside the door. The camera-to-shelf distance may be set to a value other than 4", in some examples. In other examples with a door-container assembly of varying thickness or dimensions, the camera may be positioned near the handle side of the door with an approximately 40° tilt towards the hinge side without having its view blocked by the display screen inside the door.

In an example, two cameras, positioned 28" or more away from the hinge and rotated about 50° towards the hinge edge of the door, may be used to capture all contents of the retail product container 102. In another example, one or more cameras may be set at a rotation angle about 30° to 90° towards the hinge edge of the door to optimize capture of the contents of the retail product container 102. The rotation angle of the cameras may be based on a size dimension of the door, door-opening, and/or shelf configuration. In one example, one camera may be located 21" from a top edge of the door 230 and the other camera may be located 21" from a bottom edge of the door 230, and the two cameras may be 30" away from each other. In another example, the cameras may be positioned roughly equidistant along the door vertically to optimize image capture of the contents of the retail product container 102. Various camera locations and/or orientations locations are merely exemplary, and in other examples, other specifications may be used to locate and/or orient the cameras.

Figure 6:
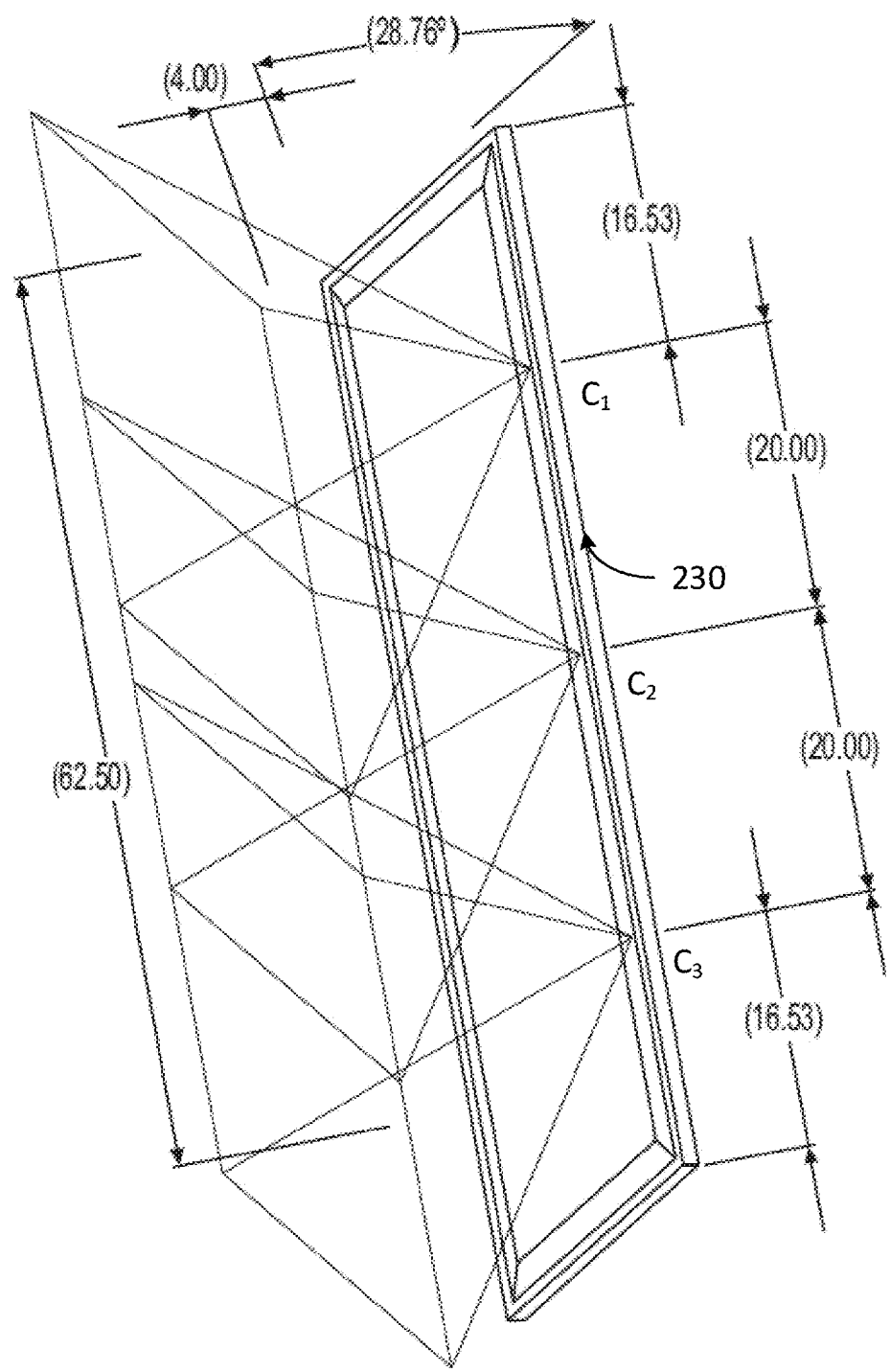
FIG. 6 shows an example placement of cameras on a door of a retail product container in accordance with an embodiment.
Figure 14:
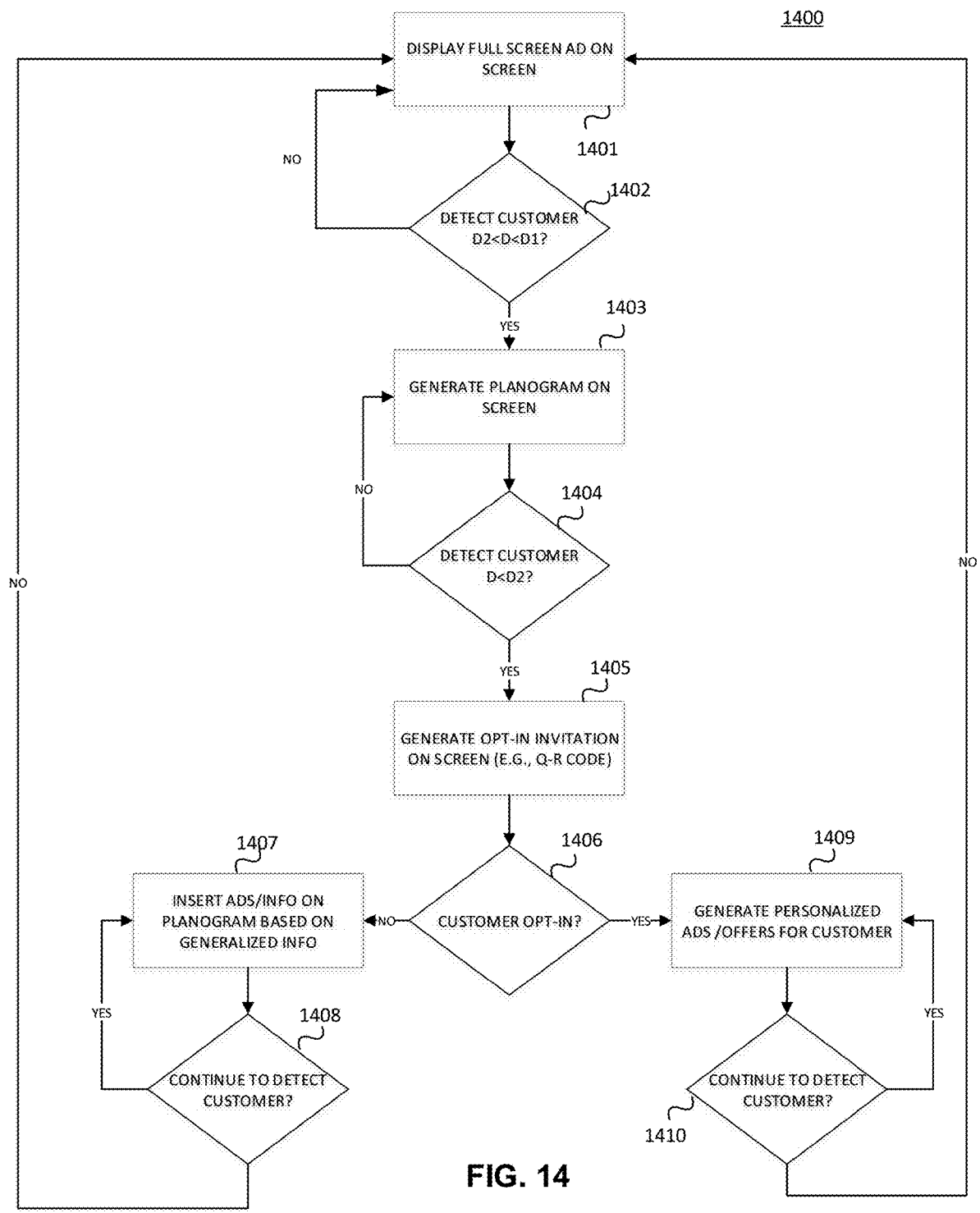
FIG. 14 shows a flowchart for generating advertisements on a screen of a retail product container in accordance with an embodiment.

FIG. 6 illustrates example camera positions in the door 230 of the retail product container 102. The camera FOV is shown as a transparent pyramid. In the example of FIG. 14, a top camera $C_1$ and a bottom camera $C_3$ are located about 16.5" from the top edge and the bottom edge of the door frame. A center camera $C_2$ may centered on the door edge and may be 20" from each of the other two cameras. In an examples where the door 203 is not centered vertically on products on the shelves inside the retail product container 102, the position of one or more of the three cameras may be shifted up or down accordingly. The cameras may be angled such that their FOV is just slightly missing the inside surface of the door. Because the hinge is close to the edge of the shelves, this positioning keeps the hinge side of the scene at the edge of the camera image for almost all door angles.

Figure 7:
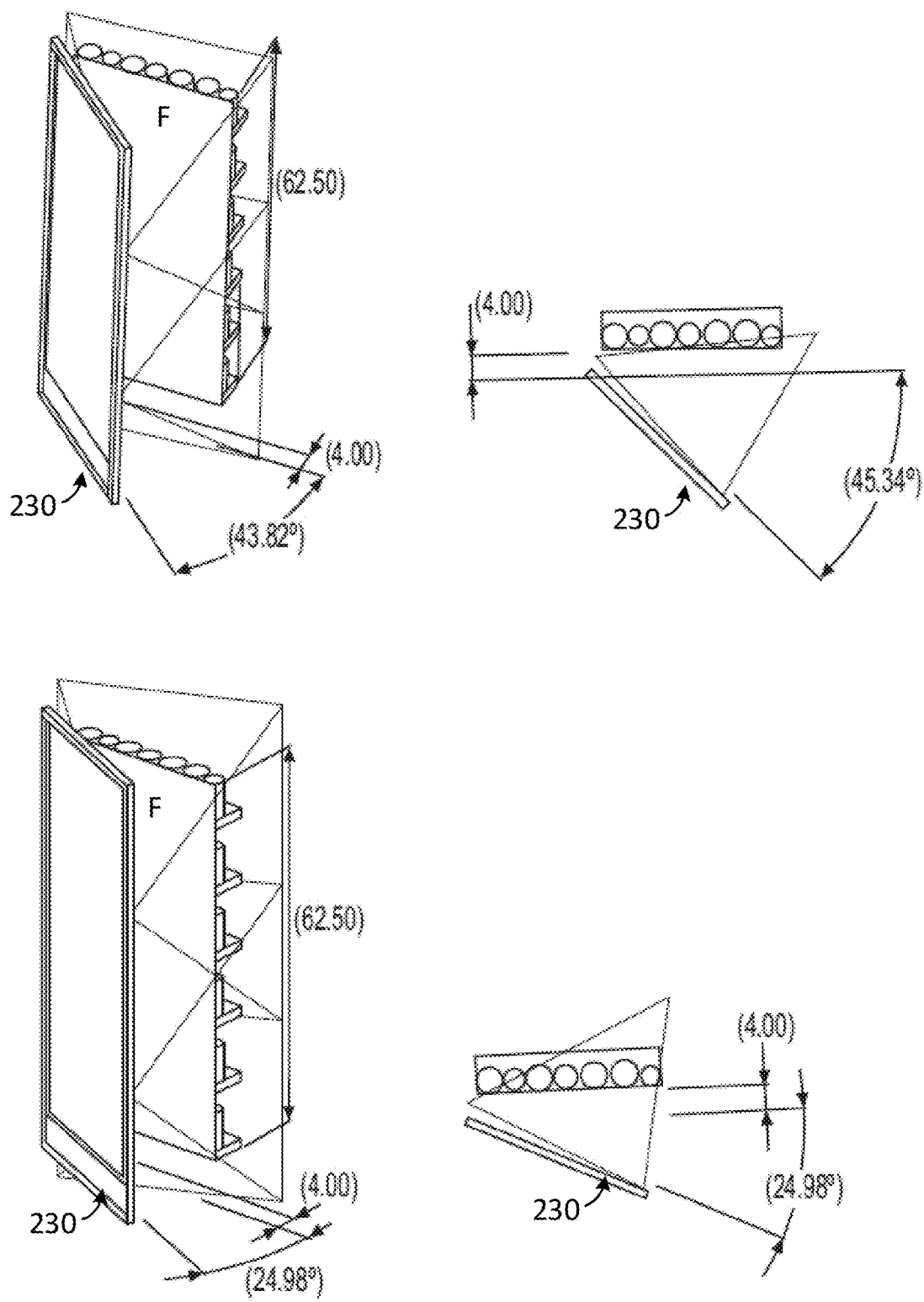
FIG. 7 shows different views of a retail product container when the door is open in accordance with an embodiment.

FIG. 7 shows different views of an illustrative retail product container and door 230 from the front and top when the door 230 is open about 44° or 25°. The camera FOV is represented as a transparent pyramid in orthogonal views and a triangle in the top views. The face of the shelves are marked "F". When the door 230 is open 30° or more, the entire scene is contained within the FOV. When the door angle decreases to 25°, portions of the scene on the handle side may start to move outside the camera FOV. A person of skill in the art after review of the entirety disclosed herein will appreciate that the disclosure is not limited to the specific angles disclosed in the preceding example. Rather, the angles and specifications may be adjusted based on the fundamental teachings of this disclosure.

FIG. 8 shows different types of advertisements 801, 802, 803, 804, 805 that may be presented on a display 416 of the retail product container 102 in accordance with an embodiment. Advertisement 801 shows a full screen advertisement while advertisements 802-805 (corresponding to a banner ad, hot spot, label/tag, and spot deal, respectively) show inserted offers within a planogram for the retail product container 102. For example, a display advertisement may include labels at the bottom of the image of the product and tags at the top of the image of the product on the display screen. Labels and tags may be selected and activated from a pre-determined pool of animated icons. For example, the native advertisement for the pizza in a display advertisement may be substituted with an animated graphic rendering of a steaming pizza. While for purposes of patent illustrations, the products displayed on the display 416 in FIG. 8 are shown as generic images with no branding, in actual operation, the graphical images displayed would be brand-specific and include a brands logo, name, colors, and other characteristics.

As will be discussed, in some examples, inserted offers may be customized based on a customer in proximity to retail product container 102.

Referring to advertisement 802, customer detector 418 may detect when a customer is looking at (viewing) region 851 of an advertisement (for example, advertisement 802). If so, an advertisement that is targeted to one or more products shown in region 851 may be displayed on screen 416.

Referring to full screen advertisement 801, while a single advertisement may occupy the entire area of screen 416, embodiments may support a plurality of advertisements (in different display regions) that may be simultaneously displayed on screen 416.

Figure 9:
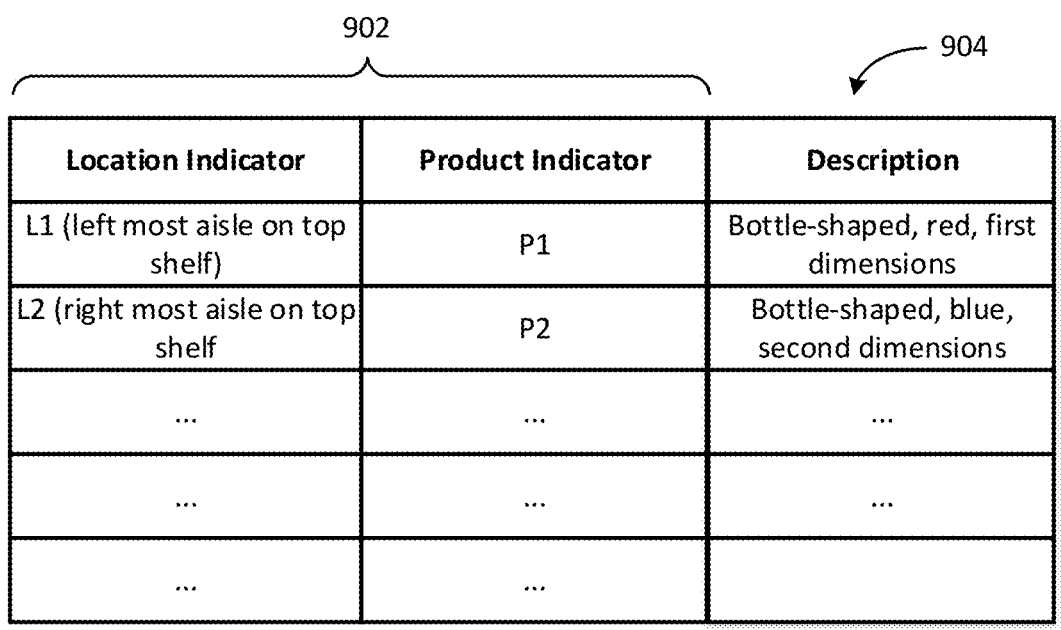
FIG. 9 shows a planogram mapping of an internal storage volume of a retail product container and descriptions of different products in accordance with an embodiment.

FIG. 9 shows an inputted planogram mapping 902 of the internal storage volume of the retail product container 102. The planogram mapping 902 may be stored, for example, in a data store 111 (e.g., associated with the controller 101). The planogram mapping 902 may be received (e.g., inputted to the data store) from a cloud services 104, a wireless device 106, and/or a combination thereof. For example, as illustrated in FIG. 1B, a user at a retail store location may input (e.g., enter, create, update, verify, etc.) a planogram mapping 902 that is stored in the data store 111 using a mobile wireless device 106. The user may be an employee at the retail location 100 or may otherwise be an authorized user (e.g., a vendor, product supplier, consultant, authorized third-party, or other user) that uses a mobile device 106 to verify and update a planogram mapping 902 that was previously downloaded to the data store 111 from the cloud 104. In some examples, a central, corporate office may have prepared an initial planogram mapping 902 and distributed it to one or more retail product containers 102 through cloud services 104.

The planogram mapping 902 may comprise one or both of: product indicators of products stored within the retail product container 102 and corresponding location indicators of locations, within the retail product container 102, where the products are to be stored. For example, the planogram mapping 902 may indicate that a product P1 may be stored at location L1, a product P2 may be stored at location L2, etc. Referring to FIG. 8 as an example, the digital display 416 on the retail product container 102 may display the digital planogram illustrated in 803. The value of the location L1 stored in the data store 111 may indicate the left-most aisle/spot on the top shelf is designated for slim plastic bottles of a particular type of beverage. Corresponding to location L1 in the planogram mapping 902 stored in the data store 111, a value of product P1 may indicate a slim plastic bottle shape of a particular dimension. Meanwhile, for a location L2 indicating the right-most aisle on the top shelf, the value of product P2 may indicate the same slim plastic bottle shape of a particular dimension, but include color characteristics specific to that bottle. For example, product P2 in the data store 111 may indicate a particular color scheme and a label with "Y" in particular colors. Meanwhile, P1 may indicate a label with "X" in particular colors.

Accordingly, the location may include a specific shelf (e.g., top shelf, bottom shelf, third shelf above the bottom shelf, etc.) and/or a position on the shelf (e.g., left-most aisle/spot on the shelf, approximately the center of the shelf). In other embodiments, the location may be an x-coordinate and y-coordinate in a front-facing plane of the internal storage volume of the retail product container 102 as captured by the internal-facing one or more cameras. For example, the left-most, bottom corner of a composite image generated by the camera(s) may be a (0,0) coordinate in the x-y plane. In some examples, a z-coordinate may also be incorporated in the location corresponding to the distance depth-wise into the internal storage volume in a direction towards the back of the retail product container 102. The system 170, 160, 150 may receive as an input the composite image generated by the camera(s) and detect shelves in the image using one or more of the method steps described herein. The generation of the composite image may include identifying and removing duplicate shelves from multiple camera angles, identifying the shelf edges, and the like. In one example, the system is trained to identify shelves (e.g., shelf edges) in a variety of circumstances. Then, in some examples, at a later stage, a separate trained model may identify the objects/products on the shelves. In some examples, the detection of the shelves in the image may be used in combination with the planogram product image dimensions to identify where products should be in combination with identifying the objects themselves. In other embodiments, the location of products in the retail product container 102 may be more or less granular in detail; for example, the location may simply be an identification of which retail product container 102 should hold the product, and not specifically at what shelf, shelf location, and/or shelf-depth it should be located. The product indicators may be indexed by corresponding location indicators. The product indicators may be stock keeping unit (SKU) identifiers, in some examples, or may be another identifier of the product.

The data store 111 may comprise, in addition to the inputted planogram mapping 902, descriptions 904 of the products stored in the retail product container 102. The descriptions 904 may be downloaded from the central data store 112 which may comprise descriptions associated with all products stocked by a retailer and/or all/most retailers. For example, when a user at the retail store location inputs the planogram mapping 902, the edge computing device 110 may download descriptions, associated with products identified in the planogram mapping 902, from the central data store 112 and store them in a local data store 111. In one example, a file comprising the descriptions 904 may be manually loaded to the data store 111, by a user, using a wired or a wireless communication protocol (e.g., a universal serial bus (USB) protocol, a local area network (LAN) protocol, or an Institute of Electrical and Electronics Engineers (IEEE) 802.11 protocol).

In at least some examples, the local data store 111 may comprise product indicators and descriptions 904 associated with a subset of all products stocked by a retailer (and not just products stored in the retail product container 102). The subset of products may comprise products in the retail product container 102, other products that may be stored in a proximity of the retail product container 102, and/or other products that may be related to (e.g., in a same category as) products stored in the retail product container 102. For example, if the retail product container 102 comprises soft drink bottles, the descriptions 904 may comprise descriptions associated with the soft drink bottles and further comprise descriptions associated with related products such as soft drink cans. In an example, products may be categorized into a plurality of categories (e.g., frozen food, meat, poultry, dairy, meat). If the retail product container 102 is used to stock a particular category of products, the data store may comprise descriptions and identities associated with all products in the particular category.

The descriptions may comprise one or more of corresponding shapes of the products (e.g., tall bottle, short bottle, tall can, glass bottle, plastic bottle, paper carton, short can, square box, rectangular box, bag, irregular shape, other shapes), corresponding colors of (including, in some embodiments, ornamental elements and/or logos on) the products' packaging (e.g., red, orange, yellow, green, blue, red background with white stripes, blue background with bold white text, red box with photos of pizza, and others), corresponding dimensions of the products (e.g., 6" tall with approx. 2" wide diameter, approx. 12"×12" box with indeterminate thickness, approx. 10"×10" box with 1" thickness, 200 pixels×200 pixels box, and others), and/or the like. For example, corresponding to location L1 indicating left-most aisle on the top shelf, a description of product P1 may indicate a bottle shape with first dimensions and with a red color scheme. For a location L2 indicating the right-most aisle on the top shelf, a description of product P2 may indicate a bottle shape with second dimensions and with a blue color scheme. The descriptions may be received from the cloud services 104, the wireless device 106, or may be input using the interface 422.

The data store 111 may further comprise advertisement content (e.g., artwork, multimedia content) associated with the products stored in the retail product container 102 or a subset of products stocked by a retailer. For example, if the retail product container 102 is for dairy products, the data store 111 may comprise advertisement content associated with the dairy products. The data store 111 may further comprise advertisement content associated with other retail product containers (e.g., the retail product container 103) that may be in proximity of the retail product container 102 or advertising content associated with products in a same category as products in the retail product container. For example, if the retail product container 102 is for dairy products and a nearby located retail product container 103 is for beverages (e.g., soft drinks, fruit juices), the data store 111 may comprise advertisement content associated with dairy products and the beverages.

The advertisement content may be downloaded from the central data store 112 which may comprise advertisement content associated with all products stocked by a retailer. As further described with reference to FIG. 11, an ad manager associated with the controller 111 may request a set of advertisements, varying from one advertisement to many (e.g., hundreds of) advertisements, to be downloaded to the data store 111. In other examples, the advertisement content may be manually loaded to the data store, by a user, using a wired or a wireless communication protocol (e.g., a USB protocol, a LAN protocol, or an IEEE 802.11 protocol).

The central data store 112 may be updated whenever new products are introduced, planogram mappings are modified, and/or product descriptions are changed. The central data store 112 may push updates to the data store 111. The updates may be periodical (e.g., once every week, once a month) or may be in response to a change in information associated with products stored in the retail product container 102 or change in the planogram mapping 902. At least one advantage of storing a local cache memory in data store 111 is that a temporary loss of connectivity between the retail product container 102 and remote cloud services 104 does not halt operation of the system 100 at the retail location. The edge processor 101 may operate and later synchronize with the remote cloud service 104 without disrupting operation to customers in a retail location.

A controller (e.g., the edge computing device 110) may post-process one or more images captured by cameras (as described above) to generate a composite image. Based on the composite image, the planogram mapping 902, and the description of the products, the controller may determine inventory status of the products in that retail product container 102. Determining the inventory status of the products may comprise determining whether products in the inputted planogram mapping 102 are present in the retail product container 102, quantities of the products, whether the products are located at the indicated locations in the planogram, etc.

The controller may determine an advertisement to be displayed on the display 416 based on the determined inventory status of the products. The advertisement may indicate that a product is out of stock, for example, based on a determination that the product is not in the retail product container 102, in accordance with one or more procedures described herein. Additionally, or alternatively, the controller may generate and transmit a message (e.g., to the wireless device 106 associated with an employee or another computing device) indicating that the product is not in the retail product container 102. The advertisement may indicate a product (e.g., an artwork associated with the product), for example, based on a determination that the product is in the retail product container 102, in accordance with one or more procedures described herein.

The controller may determine occupancy of a location based on post-processing the composite image. The controller may, for example, use an edge detection algorithm to determine occupancy of a location.

The controller may determine, based on post-processing the composite image or using other sensor data, that a location in the retail product container 102 does not comprise any product. Based on this determination, the controller may determine that a product mapped to the location in the planogram mapping 902 is not in the retail product container 102. For example, the controller may determine that the left-most aisle/spot on the top shelf (e.g., location L1 designated for product P1) does not comprise any product. Based on this, the controller may determine that the product P1 is not in the retail product container 102. The controller may search for the product in a periphery of the location L1 to accommodate any offsets in the placement of the product in the retail product container 102. If the controller determines that location L1 does not comprise any product, the controller may generate an advertisement, to be displayed on the display 416, indicating that the product P1 is not in stock at the retail product container 102. The advertisement may indicate, instead of a label/tag associated with product P1, an artwork showing that product P1 is out of stock. The controller may send the advertisement to the display controller associated with the display 416. The display controller may output the advertisement on the display 416.

The controller may determine, based on post-processing the composite image or using other sensor data, that a location in the retail product container 102 comprises a stored product (e.g., the location is occupied with an item). The controller may further determine, based on post-processing the composite image, other attributes (e.g., shape, color, dimensions, etc.) of the stored product. For example, the post-processing may include, in some examples, a determination of the dimensions of the product based on the quantity of pixels occupied by the product in the composite image and the known distance of the shelf from the camera position. For example, a 200-pixel by 200-pixel image of a box in the composite image may correspond to a 10"×10" box at a predetermined position on the shelf. The post-processing steps may scale the pixel-by-pixel image to account for additional distance front the shelf. In addition, the controller may compare the determined attributes of the stored product with a description of a product that is mapped, in the planogram mapping 902, to the location. The controller may determine that the product is in the retail product container 102 if the determined attributes of the stored product match the description. The controller may determine that the product is not in the retail product container 102 if the determined attributes of the stored product do not match the description.

For example, the controller may detect, based on post-processing the composite image or using other sensor data, that the left-most aisle on the top shelf (e.g., location L1 designated for product P1) comprises a product. The controller may further determine, based on post-processing the composite image, other attributes of the product detected at location L1. The controller may determine a shape of the detected product, a color of the detected product, and/or dimensions of the detected product. The controller may determine that the detected product at the location L1 is the product P1 based on: determining that the detected product is bottle shaped; determining that the color of the detected product is red; and/or determining that detected product has first dimensions. The controller may, for example, determine individual confidence scores (e.g., probability measures) associated with whether the detected product is bottle shaped, whether the color of the detected product is red, and/or whether the detected product has first dimensions. The controller may generate an overall confidence score based on the above confidence scores to determine whether the detected product is the product P1. For example, if the overall confidence score is higher than a threshold (e.g., 60%, 70%, or any other value), the controller may determine whether the detected product is the product P1.

Based on the determination, the controller may generate an advertisement, to be displayed on the display 416, indicating the product P1. The advertisement may indicate an artwork of the product P1 (e.g., a label/tag associated with product P1). The controller may send the advertisement to the display controller associated with the display 416. The display controller may output the advertisement on the display 416.

In one example, the controller may determine that the detected product at the left-most aisle on the top shelf is not the product P1 based on: determining that the shape of the detected product is not bottle shaped; determining that the color of the detected product is not red; and/or determining that the dimension of the detected product is not equal to the first dimension. For example, if any of the individual confidence scores are lower than a threshold (e.g., 60%, 70%, or any other value), the controller may determine that the detected product is not the product P1. For example, if the overall confidence score is lower than the threshold (e.g., 60%, 70%, or any other value), the controller may determine that the detected product is not the product P1.

If the controller determines that the detected product at the location L1 is not the product P1 (e.g., is not red and/or does not have the aforementioned first dimensions), the controller may attempt to identify the detected product. The controller may for example, scan descriptions of products (e.g., that might be associated with other locations) indicated in the inputted planogram mapping 902 to identify the detected product. The controller may for example determine that the detected product is product P2 based on: determining that the detected product is bottle shaped; determining that the color of the detected product is blue; and/or determining that detected product has second dimensions. The controller may use individual confidence scores and/or an overall confidence score, as described above.

In one example, an artificial intelligence network on which one or more machine learning algorithms/models are executing is included in the system disclosed herein. A framework for a machine learning algorithm may involve a combination of one or more components, sometimes three components: (1) representation, (2) evaluation, and (3) optimization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

The aforementioned artificial neural network may be configured to effectuate decision-making. As a simplified example for the purposes of explanation, an artificial neural network may be configured to detect characteristics of products in the inputted image. The photo image may be provided as an input to the neural network. The layers of nodes of the neural network may be each configured to perform specific steps as illustrated in the steps 2004, 2006, 2008 of FIG. 20. Multiple subsequent layers may further refine this processing, each looking for further more specific tasks, with each node performing some form of processing which need not necessarily operate in the furtherance of that task. The artificial neural network may then predict whether the identified shape, color, dimensions, and/or other characteristics of the product match a product description of a product that is supposed to be located at a particular position on the shelf in the particular retail product container. The prediction may be correct or incorrect, and the neural network may generate a confidence value/score commensurate with whether the prediction is correct or incorrect.

The feedback system of the artificial neural network may be configured to determine whether or not the artificial neural network made a correct decision. Feedback may comprise an indication of a correct answer and/or an indication of an incorrect answer and/or a degree of correctness (e.g., a percentage). For example, in the product description recognition example provided above, the feedback system may be configured to determine if the product was correctly identified. The feedback system may already know a correct answer, such that the feedback system may train the artificial neural network by indicating whether it made a correct decision. The feedback system may comprise human input, such as an expert user of computing machine 115 telling the artificial neural network 700 whether it made a correct decision. The feedback system may provide feedback (e.g., an indication of whether the previous output was correct or incorrect) to the artificial neural network. The feedback system may additionally or alternatively be coupled to a data store such that output is stored. The feedback system may not have correct answers at all, but instead base feedback on further processing: for example, the feedback system may comprise a system programmed to identify products on a shelf in an image, such that the feedback allows the artificial neural network to compare its results to that of a manually programmed/curated system.

In one example, the artificial neural network may be dynamically modified to learn and provide better input. Based on, for example, previous input and output and feedback from the feedback system, the artificial neural network may modify itself. For example, processing in nodes may change and/or connections may be weighted differently. Following on the example provided previously, the product identification may have been incorrect because the photos provided to the algorithm were tinted in a manner which made all product labels look red. As such, some node may detect false positives and may be considered unreliable, and the connections to that node may then be weighted significantly less. Additionally or alternatively, the node may be reconfigured to process images differently. The modifications may be predictions and/or guesses by the artificial neural network, such that the artificial neural network may vary its nodes and connections to test hypotheses.

The artificial neural network need not have a set number of processing nodes or number of sets of processing nodes, but may increase or decrease its complexity. For example, the artificial neural network may determine that one or more processing nodes are unnecessary or should be repurposed, and either discard or reconfigure the processing nodes on that basis. As another example, the artificial neural network may determine that further processing of all or part of the input is required and add additional processing nodes and/or sets of processing nodes on that basis.

The feedback provided by the feedback system may be mere reinforcement (e.g., providing an indication that output is correct or incorrect, awarding the machine learning algorithm a number of points, or the like) or may be specific (e.g., providing the correct output).

The artificial neural network may be supported or replaced by other forms of machine learning. For example, one or more of the nodes of artificial neural network may implement a decision tree, associational rule set, logic programming, regression model, cluster analysis mechanisms, Bayesian network, propositional formulae, generative models, and/or other algorithms or forms of decision-making. The artificial neural network may effectuate deep learning.

In one example, machine learning algorithms may rely on unique computing system structures and sometimes leverage neural networks. Such structures, while significantly more complex than conventional computer systems, are beneficial in implementing machine learning. For example, an artificial neural network may be comprised of a large set of nodes which, like neurons in the brain, may be dynamically configured to effectuate learning and decision-making. Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network may learn and/or be dynamically reconfigured. Some artificial neural networks may use nonlinear processing, but other forms of nonlinear processing may be used to implement a machine learning algorithm in accordance with features described herein.

In another example, a trained convolution neural network (CNN) (one example of a feed forward network), takes input data, (e.g., a picture of a person) into convolutional layers (aka hidden layers), applies a series of trained weights or filters to the input data in each of the convolutional layers. The output of the first convolutional layer is an activation map (not shown), which is the input to the second convolution layer, to which a trained weight or filter (not shown) is applied, where the output of the subsequent convolutional layers results in activation maps that represent more and more complex features of the input data to the first layer. After each convolutional layer a non-linear layer (not shown) is applied to introduce non-linearity into the problem, which nonlinear layers may include tan h, sigmoid or ReLU. In some cases, a pooling layer (not shown) may be applied after the nonlinear layers, also referred to as a downsampling layer, which basically takes a filter and stride of the same length and applies it to the input, and outputs the maximum number in every sub-region the filter convolves around. Other options for pooling are average pooling and L2-norm pooling. The pooling layer reduces the spatial dimension of the input volume reducing computational costs and to control overfitting. The final layer(s) of the network is a fully connected layer, which takes the output of the last convolutional layer and outputs an n-dimensional output vector representing the quantity to be predicted, e.g., probabilities of image classification 20% automobile, 75% boat 5% bus and 0% bicycle, i.e., resulting in predictive output (O*), e.g. this is likely a picture of a boat. The output could be a scalar value data point being predicted by the network, a stock price for example. Trained weights may be different for each of the convolutional layers, as will be described more fully below. To achieve this real-world prediction/detection (e.g., it's a boat), the neural network needs to be trained on known data inputs or training examples resulting in trained CNN. To train CNN many different training examples (e.g., many pictures of boats) are input into the model. A skilled artisan in neural networks will fully understand the description above provides a somewhat simplistic view of CNNs to provide some context for the present discussion and will fully appreciate the application of any CNN alone or in combination with other neural networks will be equally applicable and within the scope of some embodiments described herein.

In one example, convolutional layers are shown as individual hidden convolutional layers up to convolutional layer n−1 and the final nth layer is a fully connected layer. It will be appreciated that last layers may be more than one fully connected layer. Training example is input into convolutional layers, a nonlinear activation function (not shown) and weights through n are applied to training example in series, where the output of any hidden layer is input to the next layer, and so on until the final nth fully connected layer n produces output. Output or prediction is compared against training example (e.g., picture of a boat) resulting in difference between output or prediction and training example. If difference or loss is less than some preset loss (e.g., output or prediction predicts the object is a boat), the CNN is converged and considered trained. If the CNN has not converged, using the technique of backpropagation, weights are updated in accordance with how close the prediction is to the known input. Of course, methods other than back propagation may be used to adjust the weights. In a second training example (e.g., different picture of a boat) is input and the process repeated again with the updated weights, which are then updated again and so on until the nth training example (e.g., nth picture of nth boat) has been input. This is repeated over and over with the same n-training examples until the convolutional neural network (CNN) is trained or converges on the correct outputs for the known inputs. Once CNN is trained, weights are fixed and used in trained CNN. There are different weights for each convolutional layer and for each of the fully connected layers. The trained CNN or model is then fed image data to determine or predict that which it is trained to predict/identify (e.g., a boat), as described herein. Any trained model, CNN, RNN, etc. may be trained further, i.e., modification of the weights may be permitted, with additional training examples or with predicted data output by the model which is then used as a training example. The machine learning model can be trained "offline", e.g. trained once on a computational platform separate from the platform using/executing the trained model, and then transferred to that platform. Alternatively, embodiments described herein may periodically or continually update the machine learning model based on newly acquired training data. This updated training may occur on a separate computational platform which delivers the updated trained models to the platform using/executing the re-trained model over a network connection, or the training/re-training/update process may occur on the platform itself as new data is acquired. The CNN is applicable to data in a fixed array (e.g., a picture, character, word etc.) or a time sequence of data. For example, sequenced measured data and other-factor data can be modeled using a CNN. Some embodiments utilize a feed-forward, CNN with skip connections and a Gaussian Mixture Model output to determine a probability distribution for the predicted calculated score, e.g., calculated score, weight, activity level, or some cardiac irregularity.

Some embodiments can utilize other types and configurations of neural network. The number of convolutional layers can be increased or decreased, as well as the number of fully-connected layers. In general, the optimal number and proportions of convolutional vs. fully-connected layers can be set experimentally, by determining which configuration gives the best performance on a given dataset. The number of convolutional layers could be decreased to 0, leaving a fully-connected network. The number of convolutional filters and width of each filter can also be increased or decreased. In some examples, the output of the neural network may be a single, scalar value, corresponding to an exact prediction for the primary time sequence. Alternatively, the output of the neural network could be a logistic regression, in which each category corresponds to a specific range or class of primary time sequence values, are any number of alternative outputs readily appreciated by the skilled artisan. Meanwhile, the use of a Gaussian Mixture Model output in some embodiments is intended to constrain the network to learning well-formed probability distributions and improve generalization on limited training data. The use of a multiple elements in some embodiments in the Gaussian Mixture Model is intended to allow the model to learn multi-modal probability distributions. A machine learning model combining or aggregating the results of different neural networks could also be used, where the results could be combined.

After the controller determines whether or not the detected product is correct, based on the determination, the controller may generate an advertisement, to be displayed on the display 416, indicating the product P2 (and/or not indicating the product P1). The advertisement may indicate an artwork of the product P2 (e.g., a label/tag associated with product P2). The controller may send the advertisement to the display controller associated with the display 416. The display controller may output the advertisement on the display 416 at a position on the display 416 corresponding to the actual location in the internal storage volume. For example, if product P2 is located on the top shelf at the left-most position in the internal storage volume, then the display controller outputs the appropriate artwork graphic at the corresponding pixel positions on the display 416. Additionally, or alternatively, the controller may generate and transmit a message (e.g., to the wireless device 106 associated with an employee or another computing device) that the product P2 is in the location L1 corresponding to the product P1.

In at least some examples, the above procedures for identifying products in the retail product container 102 may be resource efficient because the controller needs to only process the planogram mapping 902 that is associated with the retail product container 902. For example, the planogram mapping 902 may be associated with the retail product container 102 and may only comprise details associated with products that the retail product container 902 is configured to store (and not the entirety of products stocked by a retailer). As a result, the procedure may be accomplished by an edge processor with relatively lower computing capacity.

Further, since the planogram mapping 902 may be indexed by location, the controller may quickly retrieve a product description for comparison with attributes of a stored product. For example, the controller may identify a location where a product is detected and simply scan an entry corresponding to the location in the planogram mapping 902 to identify the product and determine whether the product is stocked in a correct location of the retail product container.

The controller may use machine learning algorithms to identify a stored product in the retail product container 102. The controller may use attributes (e.g., shape, color, dimensions, etc.) of the stored product in a machine learning algorithm to identify the stored product. The controller may use the machine learning algorithm, for example, if the controller is unable to identify the product based on the planogram mapping 902 and descriptions of the product.

In an example, if the controller is unable to identify a product, the controller may send a notification (e.g., to the wireless device 106 associated with an employee or the computing device 115 associated with an expert user in a remote location). The notification may comprise an identity of the retail product container 102, the composite image, and/or attributes (e.g., shape, color, dimensions, etc.) of the unidentified product for identification by the employee/expert user. The employee/expert user may identify the product and manually enter an identity of the product using the wireless device 106/computing device 115. The wireless device 106 or the computing device 115 may send the identity of the product to the controller. In an example, if the controller is unable to identify the product, the controller may send determined attributes of the product to a central cloud-based processing system (e.g., the cloud services 104) for identification. Based on identification of the product (e.g., by an employee/expert user or by the cloud-based processing system), the controller may update the planogram mapping 902 in the data store 111 and/or generate an advertisement including an artwork associated with the product. The controller may, for example, add a new entry to the planogram mapping 902 comprising information associated with the product (e.g., product indicator, location indicator, description, etc.)

In one example, when the controller is unable to identify a product in an image, user (e.g., an employee/expert, or other human) may manually identify the product and select an identity of the product. In machine learning, tasks may sometimes be broadly categorized as either unsupervised learning or supervised learning. In unsupervised learning, a machine learning algorithm is left to generate any output (e.g., to label as desired) without feedback—e.g., without human intervention. The machine learning algorithm may teach itself (e.g., observe past output), but otherwise operates without (or mostly without) feedback from, for example, a human administrator. Meanwhile, in supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a human-form or generic human face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of 700 photos with labeled, generic human faces and 10,000 random, unlabeled photos. In reinforcement learning, a machine learning algorithm is rewarded for correct labels, allowing it to iteratively observe conditions until rewards are consistently earned. For example, for every generic, human face correctly identified, the machine learning algorithm may be given a point and/or a confidence score (e.g., "75% correct").

One theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

In practice, machine learning systems and their underlying components are tuned by data scientists to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals more clear, given the nearly infinite number of variables that can possible be optimized in the machine learning system. Meanwhile, one or more of data integration, selection, cleaning, and/or pre-processing steps can sometimes be the most time consuming because the old adage, "garbage in, garbage out," also reigns true in machine learning systems.

In one example, the AI system may use one of a myriad of machine learning models including xg-boosted decision trees, auto-encoders, perceptron, decision trees, support vector machines, regression, and/or a neural network. The neural network may be any of a myriad of type of neural networks including a feed forward network, radial basis network, recurrent neural network, long/short term memory, gated recurrent unit, auto encoder, variational autoencoder, convolutional network, residual network, Kohonen network, and/or other type. The intermediate layers of the neural network may be convolutional layers, pooling layers, dense (fully connected) layers, and/or other types. The input layer may pass inputs to the intermediate layers. In one example, the layers in the neural network may use an activation function such as a sigmoid function, a Tan h function, a ReLu function, and/or other functions. Moreover, the neural network may include a loss function. When training the neural network the output of the output layer may be used as a prediction. The output data in the machine learning system may be represented as multi-dimensional arrays, an extension of two-dimensional tables (such as matrices) to data with higher dimensionality. In addition, the neural network may be compared with a target value of a training instance to determine an error. The error may be used to update weights in each layer of the neural network. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting—regularization (such as L1 or L2), dropout, and/or other techniques. The neural network may also increase the amount of training data used to prevent overfitting.

Once data for machine learning has been created, an optimization process may be used to transform the machine learning model. In one example, a cloud service 104 may be used to consolidate images captures at a retailer product container 102, and that image data may be used to train and test new models, such as a trained convolution neural network (CNN) described herein and other models. In some examples, as illustrated in FIG. 1C, a model may run on-site at the retail location on an edge computing device, however, the computationally intensive training/re-training may be off-loaded to and performed in a cloud computing service 104. For example, to provide a flexible solution, a portion of the captured images may be uploaded to the cloud so that models may be trained/updated there. Once the models are updated and/or confirmed, the cloud may distribute the new model versions to one or more edge computing devices 110 at one or more retail locations for execution. Of course, as the processing power and speed of the edge computing processor 101 improves and constraints of local data store 111 ameliorate, the use of cloud computing services 104 for off-site processing may further decrease. In one example, a temporary loss of connectivity between the computing platform at the retail location 100 and the cloud computing service 104 may be nonconsequential for a period of time if the edge computing device 110 is adequately executing the model at the edge controller 101 and using the local data store 111. Then, upon re-connection, the cloud computing service 104 may synchronize and exchange data and other information with the retail location 100.

With the model trained and updated, the optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially.

For example, the controller may be unable to identify a detected product at the location L1. The controller may determine that the detected product is box-shaped with third dimensions and is brown in color. The controller may send a notification, to the wireless device 106 associated with an employee, the composite image and the determined attributes of the unidentified product. The employee may identify the product as product P3. The wireless device may send an indication of the product P3 to the controller which may then update the planogram mapping 902 to indicate product P3 at location L1. The controller may further include the description of the product P3 at location L1 to indicate that the product P3 is box-shaped with third dimensions and is brown in color. The controller may generate an advertisement, to be displayed on the display 416, indicating the product P3.

In an example, the controller may determine the descriptions of the products based on a training procedure. For example, an employee may stock the retail product container 102 based on the planogram mapping 902 and initialize a training procedure at the controller. The controller may, based on a composite image and the planogram mapping 902, determine associated descriptions (e.g., shapes, colors, dimensions, etc.) of the products stocked in the retail product container 102. For example, the controller may scan location L1 and determine a description associated with the product P1 as stored at location L1.

Determining an inventory status of the product may comprise determining a quantity of a product (e.g., a number of packages of the product) in the retail product container 102. In an example, packages of the product in the retail product container may be stacked on top of each other and the controller may use an image processing algorithm on the composite image and further use the descriptions (e.g., shape, dimensions, color) of the product to determine to determine the quantity.

In an example, a first package of the product may obscure other packages of the product that are placed behind the package. Removal of the first package may reveal a next package. The controller may compare a plurality of composite images to determine minute changes in package placements/orientations to determine whether the first package was removed. For example, if the controller determines that the first composite image shows a package oriented in first manner and a next composite image shows a package oriented in a different manner, the controller may determine that a package was removed.

In an example, each package may be associated with a unique SKU identifier and the controller may compare a plurality of composite images to determine SKU identifiers associated with the product. If the controller determines that the first composite image shows a first package with a first SKU identifier and a next composite image shows a second package with a different SKU identifier, the controller may determine that the first package was removed.

The controller may count a number of times a package was removed. Based on an initial quantity of packages stocked in the retail product container 102 and the count, the controller may determine the quantity of the product remaining in the retail product container. The initial quantity of packages may be indicated in the planogram mapping 902 or the description of the product. The initial quantity may be inputted by an employee stocking the retail product container 102.

The controller may generate and transmit a message (e.g., to the wireless device 106 or another computing device) indicating the quantity of the product. The controller may generate and transmit a message indicating that a product stock is low based on determining the quantity of the product and further determining that the quantity is below a (e.g., predetermined) threshold quantity. Threshold quantity for each product may be included in the description associated with the product.

Determining an inventory status of the product may comprise determining a time-on-shelf of a package in the retail product container 102. In an example where each package of the product is associated with a unique SKU identifier, the controller may determine, using the composite images and times at which the composite images were captured, a time-on-shelf associated with a package corresponding to a particular SKU identifier. For example, if a first composite image (at time 12:00 pm on Tuesday) shows a package with a first SKU and a second composite image (at time 9 pm) shows the same package with the first SKU, the controller may determine that the time-on-shelf of the package is 9 hours. In an example, the controller may determine a time-on-shelf as equal to a time period within which a count of a product does not reduce. The controller may generate and transmit a notification message (e.g., to the wireless device 106 or another computing device), for example, if a time-on-shelf of a product has exceeded a threshold. With reference to the above example, if a threshold is defined to be 14 days, the controller may transmit a notification message indicating that the time-on-shelf of the package has exceeded the threshold. Threshold times for each product may be included in the description associated with the product.

In an example, the controller may use the composite images to determine expiration dates (e.g., as stamped on labels of the products, or using SKUs). The controller may send a generate and transmit a notification message (e.g., to the wireless device 106 or another computing device), for example, if a product is past its expiration date.

The controller may be integrated with the retail product container 102 or may be located in proximity (e.g., in a retail establishment housing the retail product container). This may enable the controller to operate without any requiring external connectivity (e.g., with cloud-based services) for performing various procedures described herein.

Figure 10:
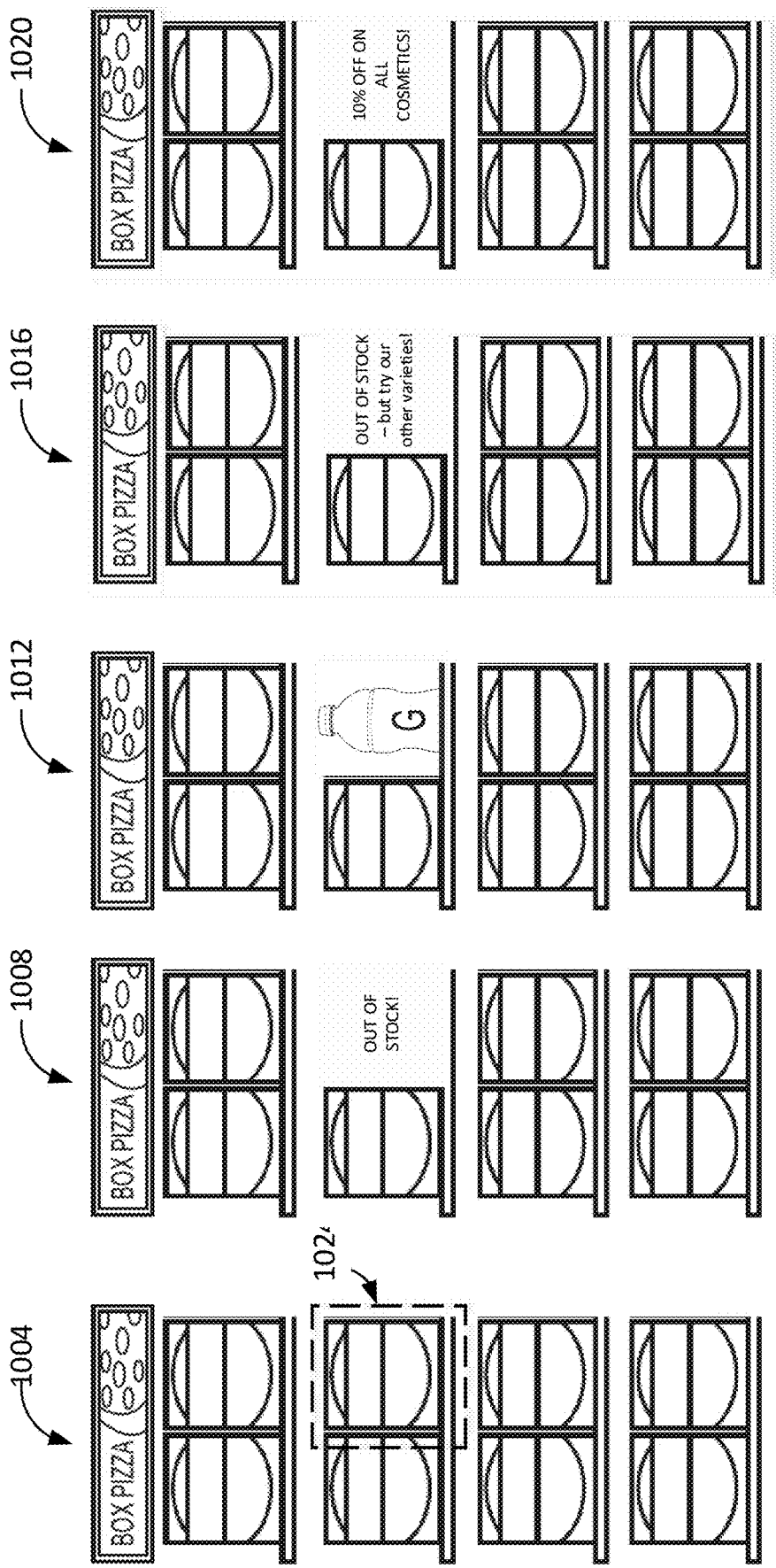
FIG. 10 shows different advertisements that may be displayed a display screen of a retail product container based on determined inventory status of products in accordance with an embodiment.

FIG. 10 shows different advertisements 1004-1020 that may be displayed on display 416 based on the determined inventory status of products in the retail product container 102. The controller may determine that product 1024 is not in stock at the retail product container 102. As shown in advertisement 1008, the controller may overlay an out-of-stock notification (e.g., a standardized out-of-stock image) on label/tag associated with the product 1024.

Alternatively, as shown in advertisement 1012, the controller may overlay a label/tag associated with a different product on the label/tag associated with the product 1024. The different product and the product 1024 may be associated with a same brand as or may be associated with different brands.

To avoid displaying a label/tag associated with a different brand, a brand corresponding to the product 1024 may protect the label/tag associated with the product 1024 by setting restriction rules on the computing platform 100 so that a retail product container 102 does or does not allow particular products' graphics to be displayed on particular retail product containers. Based on the rules, the advertisement graphic may be configured to display a label/tag associated with another product of the brand. For example, as shown in advertisement 1016, the controller may overlay a label/tag advertising other products by the brand. The brand may negotiate an agreement to protect all labels/tags in the advertisement 1008 in a similar manner.

Alternatively, as shown in advertisement 1020, the controller may overlay a label/tag associated with a promotion. For example, a retailer hosting the retail product container 102 may overlay a label/tag associated with a promotion associated with another product offered by the retailer.

Figure 11:
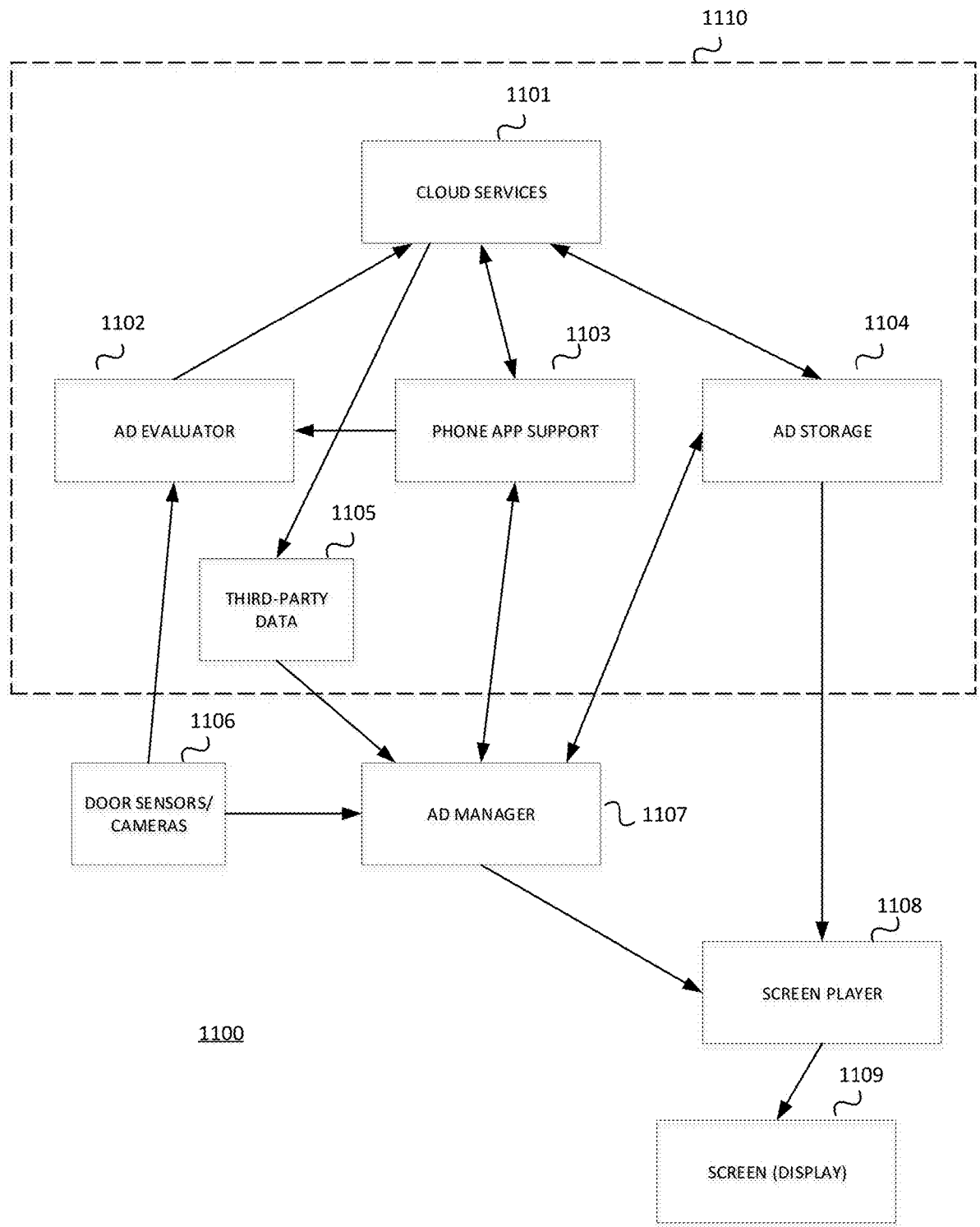
FIG. 11 shows an advertising computer system supporting one or more retail product containers in accordance with an embodiment.

FIG. 11 shows advertising computer system 1100 supporting one or more retail product containers in accordance with an embodiment. Referring to FIG. 1, computer system 1100 encompasses edge processor (controller) 101, retail product containers 102-103, and an interface with cloud services 104. For example, with some embodiments, components 1102-1105 and 1107 may be implemented at edge processor 101, and components 1106 and 1108-1109 may be implemented at retail product containers 102-103.

Referring to FIG. 11, ad manager 1107 interacts with ad storage 1104 to download advertisement content from cloud services 1101. Ad manager 1107 may request selected advertisement content (for example, based on a product type and corresponding to a plurality of advertisements) from cloud services 1101 via ad storage 1104 and may instruct that one of the plurality of advertisements be displayed on screen (display) 1109 through screen player 1108. As previously discussed, screen player 1108 may comprise media player 417 and may be implemented at retail product container 102, 103 and/or controller 101.

Ad manager 1107 may request a set of advertisements, varying from one advertisement to many (e.g., hundreds of) advertisements, to be downloaded for retail product container 102. The request may be based on the type of product stocked at retail product container 102. For example, this request by ad manger 1107 may be based on inventory information received from inventory tracker 420 (as shown in FIG. 4) or from a mapping of a container identification to designated stored products.

Ad manager 1107 may select one of the downloaded advertisements based on sensor/camera information from door sensors/cameras 1106 (for example, located at door 230 as shown in FIG. 2), third party data module 11011, and/or phone app support module 1103.

As will be discussed in further detail, ad evaluator 1102 may determine an effectiveness of a presented advertisement on screen 1109 based on information from door sensor/camera 1106 and phone app support module 1103. For example, door image sensor 1106 may indicate that a customer is viewing a particular region of the displayed advertisement and/or the customer may indicate the effectiveness through a mobile app. The level of effectiveness (as shown at blocks 1606-1610 in FIG. 16) may be determined in a number of ways. For example, the levels may be mapped to different values of time durations that the customer is looking at a product in the displayed advertisement or may be directly obtained from a customer's input via the mobile app.

While cloud services may be used to provide additional computer resources as needed by advertising computer system 1100, computer resources may be provided by one or more computer servers that may be otherwise provided by cloud services 1101. For example, ad manager 1107, ad evaluator 1102, phone app support 1103, and/or third-party data 11011 may all reside in the cloud 1110. Moreover, the aforementioned systems may all be referred to together, or separately, as cloud services 1101. For example, a vendor may provide ad content through ad storage 1104 so that the ad manager 1107 may download advertisement content from the cloud 1110. Ad manager 1107 may request selected advertisement content (for example, based on a product type and corresponding to a plurality of advertisements) from the cloud 1110 an show it on screen (display) 1109 through screen player 1108. Although components in FIG. 11 are displayed as separate, the disclosure is not so limited; and one or more components may be conflated and/or bifurcated.

Figure 12:
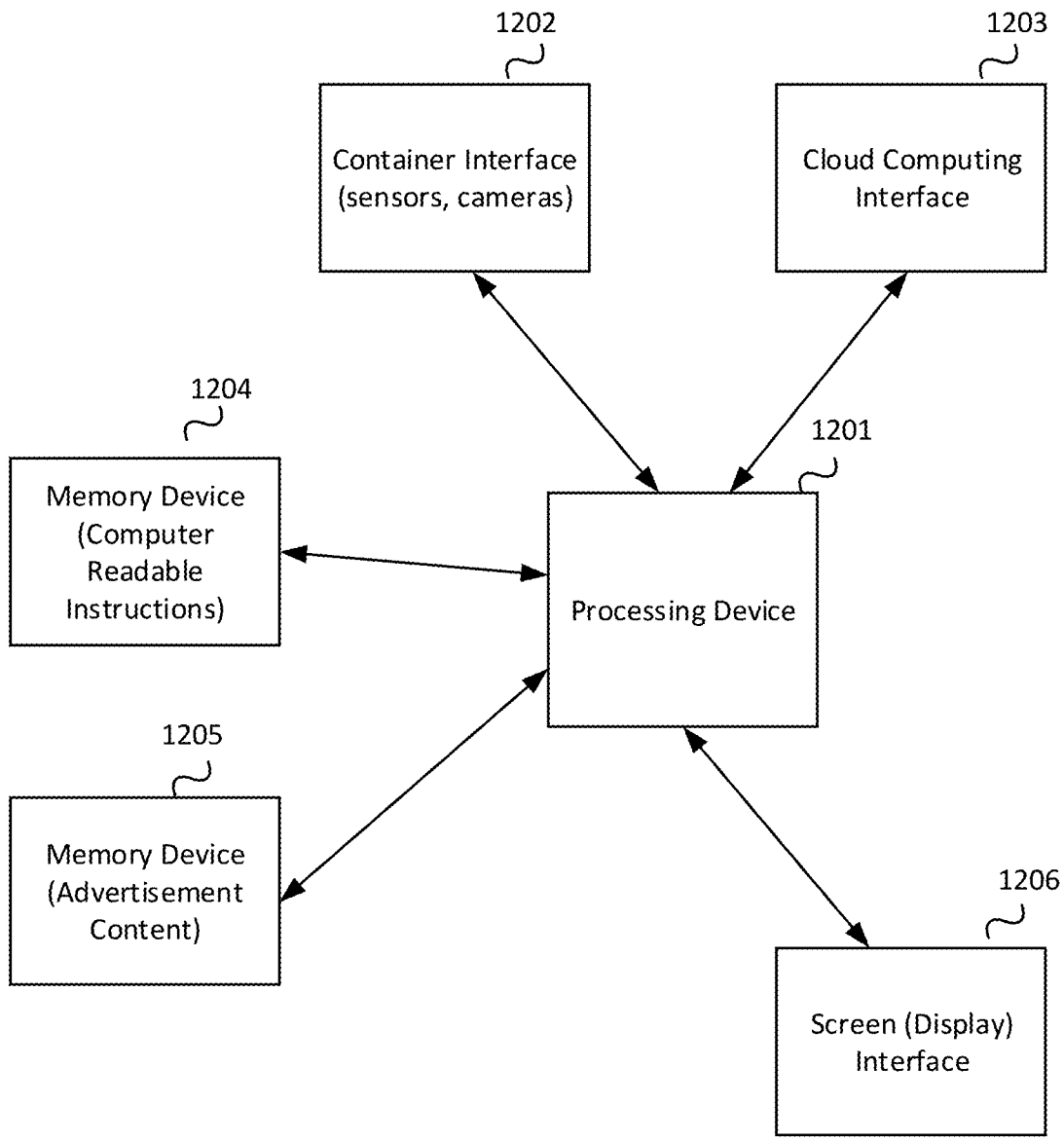
FIG. 12 shows an edge computing apparatus that supports one or more retail product containers in accordance with an embodiment.

FIG. 12 shows edge computing apparatus (controller) 1200 that may support one or more retail product containers (for example, retail product containers 102 and 103) in accordance with an embodiment. The controller 1200 may correspond to the controller 101.

Controller 1200 may include processing device 1201 where processes (for example, processes 1300-1900 as shown in FIGS. 13-19, respectively) discussed herein may be implemented. Processing device 1201 may control the overall operation of controller 1200 and its associated components. Processing device 1201 may access and execute computer readable instructions from memory device 1204, which may assume a variety of computer readable media. For example, computer readable media may be any available media that may be accessed by processing device 1201, and may include both volatile and nonvolatile media and removable and non-removable media. By way of example, and not limitation, computer readable media may comprise a combination of computer storage media and communication media.

In addition, processing device 1201 may download advertisement content from cloud services via cloud interface 1203, store the downloaded content at memory device 1205, access the downloaded content (for example, a selected advertisement) from memory device 1205, and provide the advertisement content to display 416 via screen interface 1206. As previously discussed, advertisement content may be presented to display 412 through media player 417 as shown in FIG. 4.

As previously discussed, controller 1200 may obtain advertisement content (via ad storage 1104 as shown in FIG. 11) and third-party data (via third party data module 1105) from cloud services 1101 via cloud computing interface 1203. In addition, controller 1200 may interact with a customer via wireless communication (e.g., via phone app support module 1103), and may provide advertisement evaluation (e.g., via ad evaluation 1102) through cloud computing interface 1203.

Computer storage media may include volatile and nonvolatile and removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing device.

Communication media may include computer readable instructions, data structures, program modules or other data in a modulated data signal such as a carrier wave or other transport mechanism and includes any information delivery media. Modulated data signal can be a signal that has one or more of its characteristics set or changed in such a manner as to encode information in the signal. By way of example, and not limitation, communication media may include wired media, such as a wired network or direct-wired connection, and wireless media such as acoustic, RF, infrared and other wireless media.

Processing device 1201 may also obtain image sensor data from customer detector 418 and inventory tracker 420 through interface 1202. Processing device 1201 may use this data to determine a location of a customer (e.g., via customer detector 418) with respect to retail product container 102 and the current inventory of retail product container 102.

Controller 1200 (executing computer readable instructions from memory 1204) may be configured to control the display 416 of each retail product container 102 (as shown in FIG. 4) to display current pricing information about products physically contained in the internal storage volume of retail product container 102, where the pricing may be determined by controller 1200. In some examples, current pricing information and other product details may be received from a point of sale pricing system on the premises at the retail location. This point of sale system may communicate through wired or wireless means with a controller 1200 at the retail product container 102 to update content on a display device on the retail product container 102. In other examples, the current pricing information and other information may be transmitted through a cloud-based service to the retail product container 102 at the retail premises.

Controller 1200 may be configured to detect customers from information provided customer detector 418 (as shown in FIG. 4) through interface 1202 and may be configured to display promotions on display 3112 via screen interface 1206 based on information from customer detector 418.

Controller 1200 may effectively obtain inventory information of each retail product container 102 (via inventory tracker 420 along with image recognition software). Controller 1200 may be configured to transmit data to a distributor via cloud interface 1203 and/or store regarding overall stock relating to the inventory of the plurality of retail product containers. For example, system 150 (as shown in FIG. 1A) may be configured to issue restock notifications, provide merchandising updates, pricing management, real time sales data, and behavioral consumer analytics.

Controller 1200 may be configured to instruct display 416 to display full screen advertisements when a customer is not sufficiently close to a retail product container (for example, at block 1401 as shown in FIG. 14) by customer detector 418. For example, as a customer is approaching an aisle but at a detected distance greater than a predetermined value, the customer may see full screen advertisements on display 416. As another example, when no customer is detected within the capability of customer detector 418, controller 1200 may instruct display 416 to display a full screen advertisement in accordance with a default procedure. In one embodiment in accordance with the system disclosed herein, customer detector 418 may use motion to detect whether a customer is present. In other embodiments in accordance with the system disclosed herein, the customer detector 418 may operate by detecting a human form. For example, in one embodiment, the customer detector 418 may trigger when a generic, human adult face is detected, but not simply when motion is detected. Such embodiments may reduce the quantity of false positives—e.g., a pet, a baby, or non-human movement such as wind might not trigger the customer detector 418. In some embodiments, the human form may be anonymized in that only a human form may be detected without any uniquely identifying characteristics of the person. In other embodiments, other levels of details may be detected, captured, and/or filtered by the customer detector 418 in conjunction with one or more other components of the system disclosed herein, including but not limited to image sensors 423.

As an example, if motion or a human form were detected within twenty feet of retail product container 102 (where customer detector 418 mounted on the door of that retail product container 102), controller 1200 may be configured to terminate displaying a full screen advertisement and transition to displaying a planogram of products which are located inside retail product container 102. Banner advertisements and pricing tags may also be loaded from memory 1205 and displayed at the same time as displaying the planogram. Controller 1200 may also be configured to manage merchandising advertising objects and layers.

Controller 1200 may be configured such that as a shopper (e.g., a customer) approaches closer to retail product container 102, advertisement content on display 416 can subsequently change. For example, display 416 may change to include labels (for example, organic, non-GMO, and so forth as shown in FIG. 8) and tags (for example, sale with local card, locally made, trending, and so forth). Promotional labels and tags may be activated via the controller 1200 and may be selected from a pre-determined set of static animated icons or may be customized by the retailer and/or brands based on business and marketing needs. In one embodiment in accordance with aspects of the system disclosed herein, controller 1200 may be configured to incorporate customer rating scores (for example, 1-5 stars, trending, or favorites) using one or more consumer review sources (for example, using third party data 1105 as shown in FIG. 11). Meanwhile, other embodiments of the system disclosed herein operate/function without any knowledge of the individual shopper/customer, and the system never seeks to identify individuals—i.e., it is "identity-blind" in that it never gathers or uses personally identifiable or linkable information. In some embodiments, selection of whether to execute an "identity-blind" set of features or otherwise may be determined on whether the system is located in a country or state where consumers desire privacy and/or applicable laws govern.

Controller 1200 may be configured so that as a shopper stands or lingers in front of a given retail product container 102, the contents (e.g., graphical renderings) outputted at display 416 may change again. In some embodiments, controller 1200 is able to use information from customer detector 418 to effectively learn more about that particular customer, such as gender, age, mood, and so forth. (Alternatively or in combination, as will be discussed, controller 1200 may obtain customer information through a mobile app when a customer opts-in in response to a displayed invitation.) In such embodiments, controller 1200 may be configured to process detected customer information to determine a specific or customized advertisement to present to that particular customer on display 416. By tracking shopper data in parallel with which advertising content is being presented on the displays of all retail product containers within the viewing range of the shopper, the retailer has new influence opportunities at the moment of purchasing decision, thus optimizing marketing spend and generating new revenue streams with respect to traditional approaches. Meanwhile, other embodiments of the system disclosed herein are designed with privacy and security features integrated into the technology platform and operating model. And, such embodiments operate/function without any knowledge of the individual shopper/customer, and the system never seeks to identify individuals—i.e., it never gathers or uses personally identifiable or linkable information. In such embodiments, a retail consumer-safe platform is provided that is "identity-blind." In some embodiments, selection of whether to execute an "identity-blind" set of features or otherwise may be determined on whether the system is located in a country or state where consumers desire privacy and/or applicable laws govern. Controller 1200 may be configured so that, while a shopper is standing in front of display 416 (as may be detected by an image sensor mounted on a door of that particular retail product container 102), relevant conditional advertisements are displayed on display 416 based on real-time data relating to news events, weather, sporting events, and so forth.

As discussed above, controller 1200 may be configured to keep track of the inventory of retail product container 102 via inventory tracker 420, which may comprise one or more cameras and/or sensors on the inside of retail product container 102. When controller 1200 has determined that a given product is out of stock, controller 1200 may modify the displayed content on display 416. For example, out-of-stock artwork may be displayed and/or advertisements may be swapped.

As will be discussed, processes 1300-1900 (as shown in FIGS. 13-19, respectively) are some of the processes that may be executed in accordance with aspects of one or more embodiments. Referring to FIG. 12, processing device 1201 may execute computer readable instructions from memory device 1204 to perform processes 1300-1900.

Figure 13:
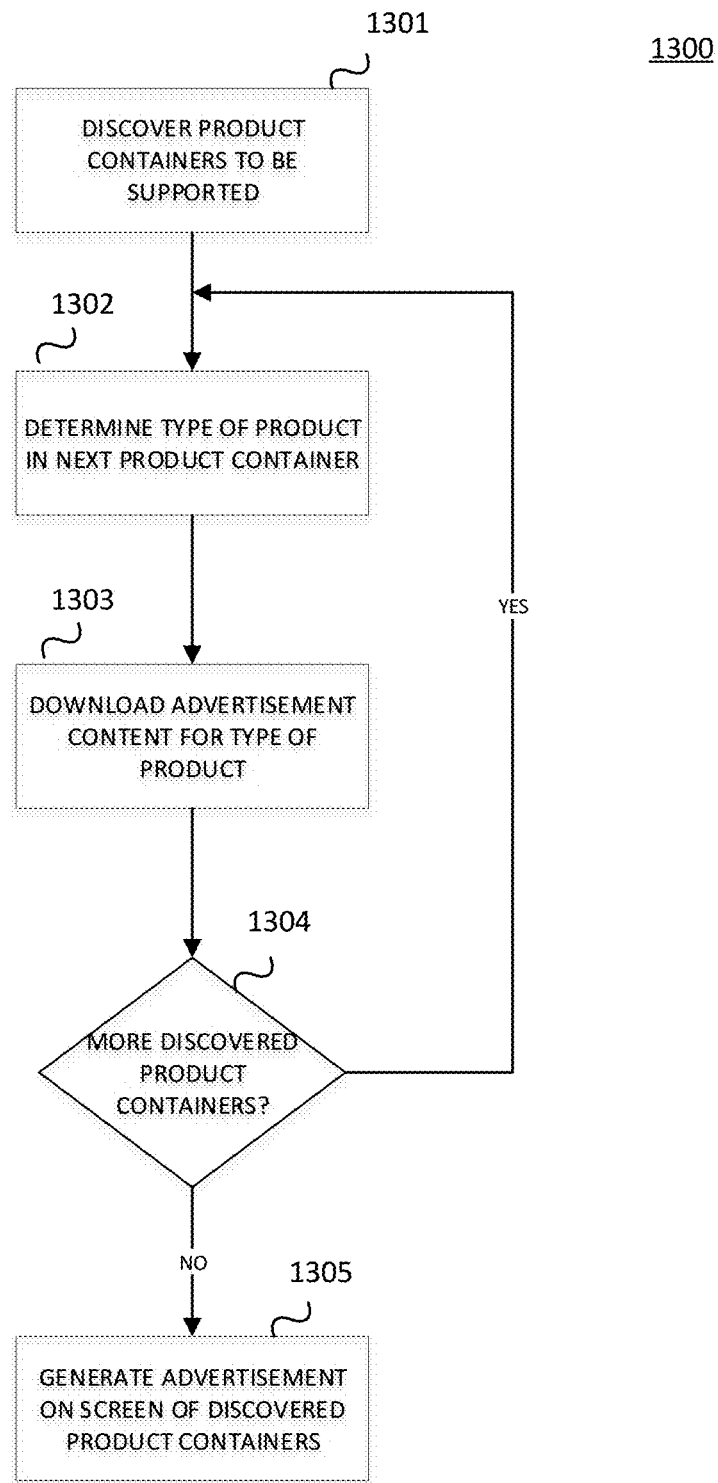
FIG. 13 shows a flowchart for configuring an advertising system in accordance with an embodiment.

FIG. 13 shows flowchart 1300 for configuring computing platform 100 (as shown in FIG. 1) supporting advertising computer system 1100 in accordance with an embodiment.

At block 1301, controller 1200 discovers the retail product containers (for example, containers 102 and 103) that are to be supported by controller 1200. (A retail product container is supported by a controller when the controller controls the advertisements displayed at the retail product container.) Embodiments may utilize a known list of retail product containers and associated devices including sensors and cameras or may use a discovery procedure (for example, for discovering IoT devices including sensors and cameras and associating them to corresponding retail product containers).

When supported retail product containers are discovered, controller 1200 determines the type of product/manufacturer stored in a given retail product container (for example, retail product container 103) at block 1302. For example, the retail product container may report scanned universal product codes of its stocked products. Alternatively or in combination, controller 1200 may access a mapping between each supported retail product container and corresponding stocked product types. At block 1303, controller 1200 may download relevant advertisements (which may be referred to as a set of advertisements) pertinent to the stocked products of the given retail product container.

If there are additional supported retail product containers, as determined at block 1304, blocks 1302-1303 may be repeated for the next supported retail product container.

After content for pertinent advertisements have been downloaded, controller 1200 may instruct each retail product container to display one of the downloaded advertisements based on various criteria (for example, as determined by processes 1400, 1500, 1600, and 1700).

FIG. 14 shows flowchart 1400 for generating advertisements on a screen of a retail product container in accordance with an embodiment. Initially, a full screen advertisement is displayed on a display of a retail product container at block 1401. For example, as previously discussed, controller 1200 may instruct retail product container 102 to display an appropriate advertisement based on products stocked at retail product container 102.

When customer detector 418 (as shown in FIG. 4) determines that a customer is within a predetermined range at block 1402, controller 1200 may instruct retail product container 102 to display a planogram at block 803 that reflects products stocked at retail product container 102.

When customer detector 418 determines that the customer approaches retail product container 102 even closer (within a predetermined distance—e.g., within twelve to fifteen feet) at block 1404, controller 1200 may generate an opt-in invitation within the displayed planogram at block 1405. For example, the invitation may comprise a Quick Response (QR) code in the center of the display. If the customer wishes to opt-in, the customer can scan the QR code through the customer's smart phone to open a link or to download a mobile app associate with the QR code. In other examples, in lieu or in addition to a QR code, an image other than a QR code (e.g., an image with a machine-detectable watermark), a Bluetooth (or other short-range wireless protocol) beacon, or other mechanism may be provided to indicate an invitation to the customer. In some examples, multiple invitations may be simultaneously transmitted to that user's device to provide the customer an option to select whichever mechanism is most preferred. In other examples, the indicated invitations may be transmitted serially such that a first method (e.g., a wireless beacon) may be used when the customer is at a particular distance range from the retail product container 102 and a second method (e.g., a QR code) may be used when the customer is in a closer proximity to the container 102. Although an example of a predetermined distance of twelve to fifteen feet was described in one of the preceding examples, the disclosure is not so limited—e.g., depending on the mechanism used to indicate an invitation to the customer, the predetermined distance may be in a range greater than fifteen feet or in a range less than twelve feet.

When the customer opts-in, as determined at block 1406, controller 1200 may generate personalized advertisements on display of retail product container 102 based on customer information obtained through the mobile app. (For example, a customer opts-in when the customer accepts an invitation by scanning the presented QR code and accepting the usage agreement for the mobile app.) Pursuant to a retail consumer-safe platform, until the customer opts-in, the system may remain "identity-blind" in that it never gathers or uses personally identifiable or linkable information. The retail consumer-safe platform may be designed with privacy and security features integrated into the technology platform and operating model. Such embodiments operate/function without any knowledge of the individual shopper/customer, and the system never seeks to identify individuals. In some embodiments, selection of whether to execute an "identity-blind" set of features or otherwise may be determined on whether the system is located in a country or state where consumers desire privacy and/or applicable laws govern.

At block 1409, controller 1200 may generate special offers via the customer's smart phone for one or more products stocked at retail product container 102. Process 1400 continues in this mode at block 1410 while customer detector 418 continues to detect the presence of the customer. Otherwise, process 1400 reverts back to block 1401, where a full screen advertisement is displayed.

When the customer does not opt-in, as determined at block 1406, advertisements may be inserted within the displayed planogram at block 1407 based on generalized information (not specific to the customer). Examples are shown as advertisements 802-805 in FIG. 8, and 1008 and 1020 in FIG. 10. Process 1400 continues in the mode at block 1408 while the customer is detected. Otherwise, process 1400 reverts to block 1401.

When process 1400 reverts to block 1401 either from blocks 1408 or 1410, process 1400 repeats executing blocks 1403-1410 when a subsequent customer is detected by customer detector 418 at block 1402.

Figure 15:
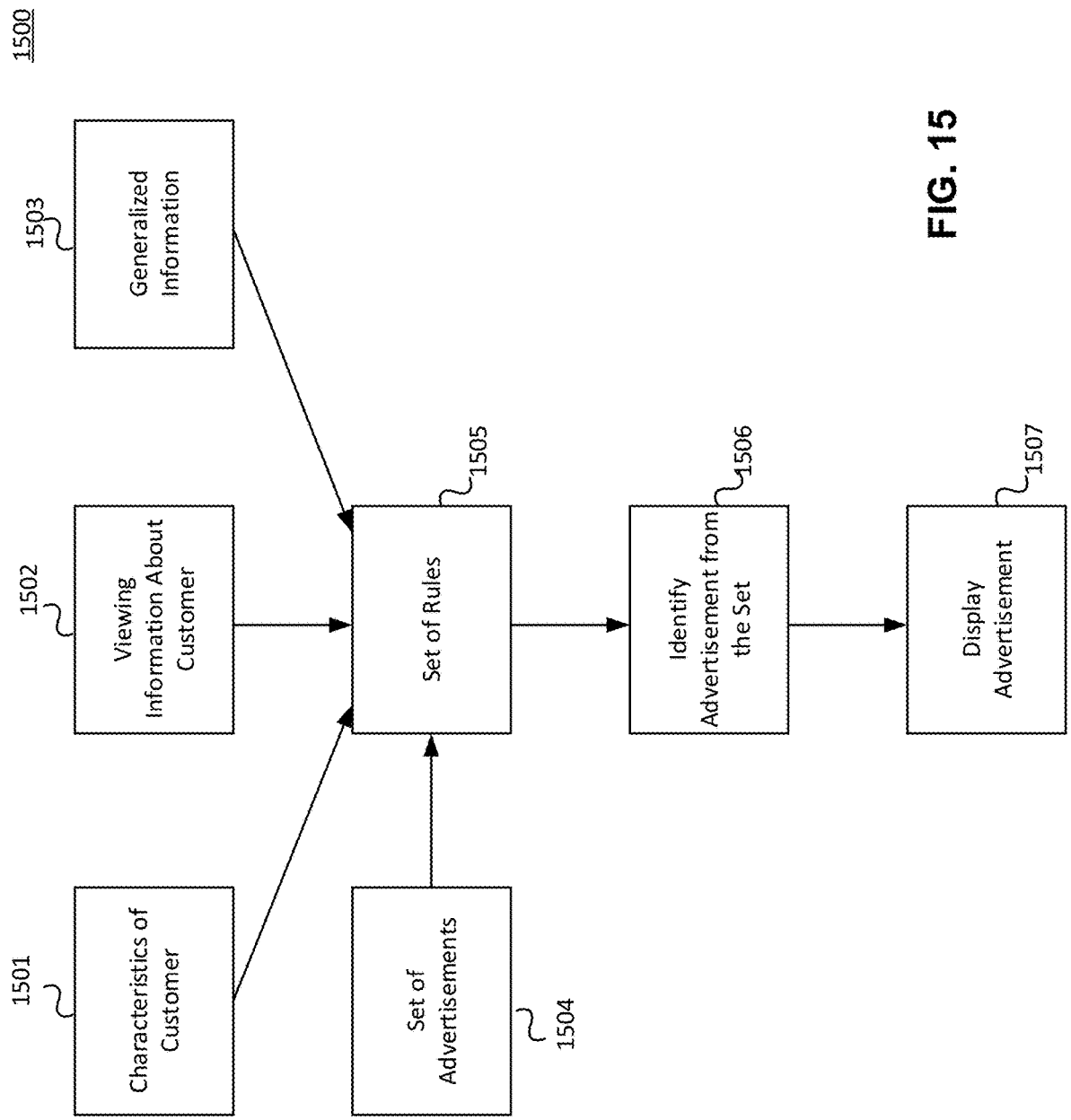
FIG. 15 shows a flowchart for displaying a selected advertisement from a set of rules in accordance with an embodiment.

FIG. 15 shows flowchart 1500 for displaying a selected advertisement from a set of rules in accordance with an embodiment. Computing platform 100 determines an advertisement presented on a container's display based on a set of rules that may encompass weather conditions, the date, and/or characteristics about a customer in proximity to the container. For example, the presented advertisement may be selected because a customer is standing by a beverage container for 20 seconds, it is 98 degrees outside, and the date July 3 (i.e. just before the Fourth of July).

Referring to FIG. 15, set of rules 1505 selects an appropriate advertisement to be displayed from set of advertisements 1504 based on different factors. In one embodiment in accordance with various aspects of the disclosure, the factors may include customer characteristics 1501, customer viewing information 1502, and/or generalized information 1503. For example, a customer may express that he/she dislikes broccoli and likes ice cream through a mobile app (e.g., after the customer opts-in). In addition, customer detector 418 may indicate that the customer is viewing a particular region of a displayed planogram where an ice cream product appears. In such a scenario, computer platform 100 may initiate an advertisement directed to the ice cream product. However, other embodiments of the system disclosed herein operate/function without any knowledge of the individual shopper/customer, such that set of rules 1505 are "identity-blind." And, those embodiments of the system never seek to identify individuals—i.e., it never gathers or uses personally identifiable or linkable information. In some embodiments, selection of whether to execute an "identity-blind" set of features or otherwise may be determined on whether the system is located in a country or state where consumers desire privacy and/or applicable laws govern.

When computing platform 100 has identified the appropriate advertisement at block 1506, the identified advertisement may be displayed at the corresponding retail product container at block 1507.

Figure 16:
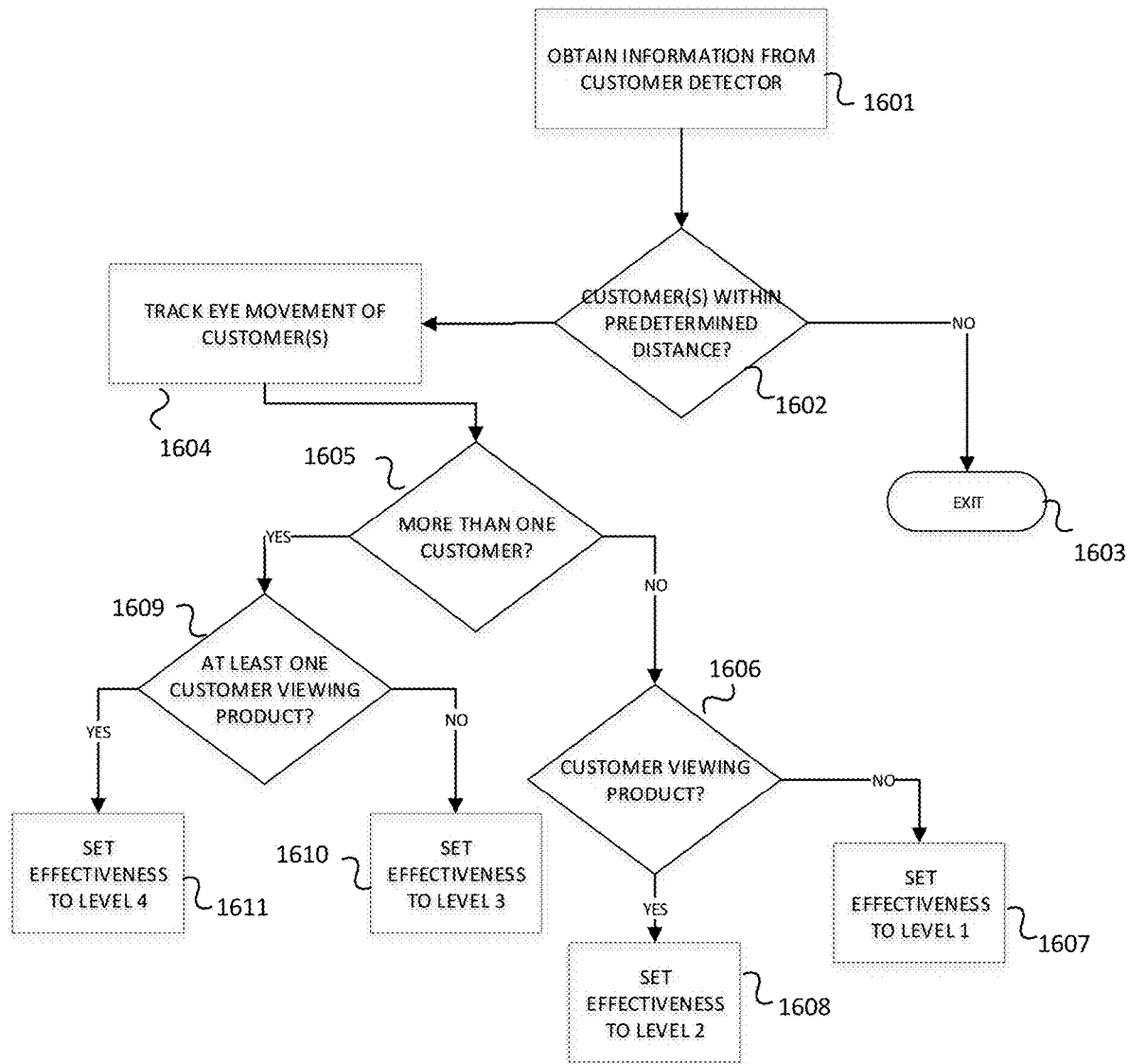
FIG. 16 shows a flowchart for determining a level of effectiveness of a displayed advertisement in accordance with an embodiment.

FIG. 16 shows flowchart 1600 for determining a level of effectiveness of a displayed advertisement in accordance with an embodiment. Computing platform 100 assesses an effectiveness of a presented advertisement on a display of a retail product container. For example, computing platform 100 may detect whether a customer is within a determined distance of the retail product container and/or whether one or more customers are viewing the presented advertisement.

Referring to FIG. 16, at block 1601 computing platform 100 may obtain information (for example, a distance of a detected customer from the container, an area of the display region that the customer is viewing, and/or a location from where the customer is viewing).

At block 1602, computer platform 100 determines whether a customer is within a predetermined distance (in other words, deemed to be close enough to a retail product container). If so, at block 1604 customer detector 418 (for example, via iris-scanning sensors) may track eye movement of the customer and provide eye movement information to controller 101 to determine the level of effectiveness (for example, a success measure) based on the eye movement information.

At blocks 1605, 1606, and 1609 computing platform 100 may assess the information to determine a level of effectiveness at blocks 1607, 1608, 1610, and 1611. For example, the customer may be staring at display region 851 of advertisement 802 (as shown in FIG. 8) versus scanning a plurality of regions. The level of effectiveness may be measured in a number of ways. For example, it may be measured by the amount of time that the customer is viewing a displayed product or by direct customer input through a mobile app (if the customer has opted-in).

However, when computing platform 100 is unable to determine a level of effectiveness, process 1600 is terminated at block 1603.

Figure 17:
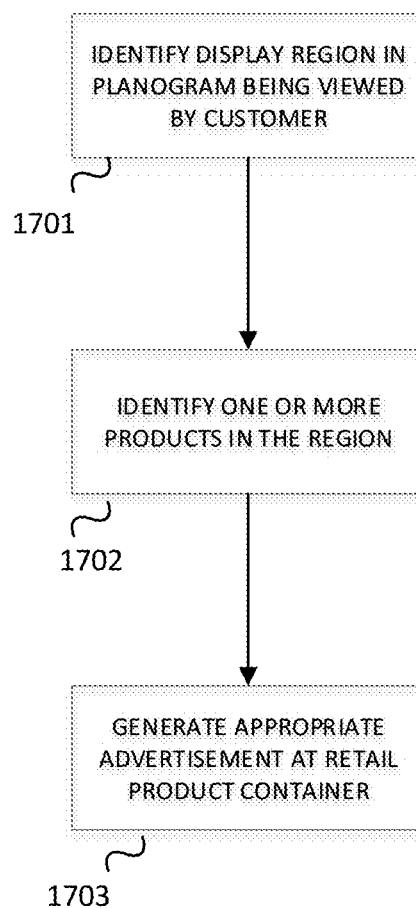
FIG. 17 shows a flowchart for generating an advertisement targeted at a product level in accordance with an embodiment.

FIG. 17 shows flowchart 1700 for generating an advertisement targeted at a product level in accordance with an embodiment. Computing platform 100 may generate an advertisement targeted a product level on a display of a retail product container. For example, a customer detector may detect that a customer is viewing a particular product displayed in a planogram at a retail product container.

Referring to FIG. 17, customer detector 418 may determine a display region that a detected customer is viewing at block 1701. For example, the customer may be viewing a lower region 851 of advertisement 802.

At block 1702, computing platform 100 may identify one or more products stocked at the detected display region. Computing platform 100 may identify the one or more products in a number of ways. For example, computing platform 100 may access a mapping of products to different regions of a displayed planogram. Alternatively or in combination, computing platform 100 may obtain inventory information about stock products at a retail product container from inventory tracker 420.

At block 1703, computing platform 100 may display an appropriate advertisement about the identified product on container's display.

Figure 18:
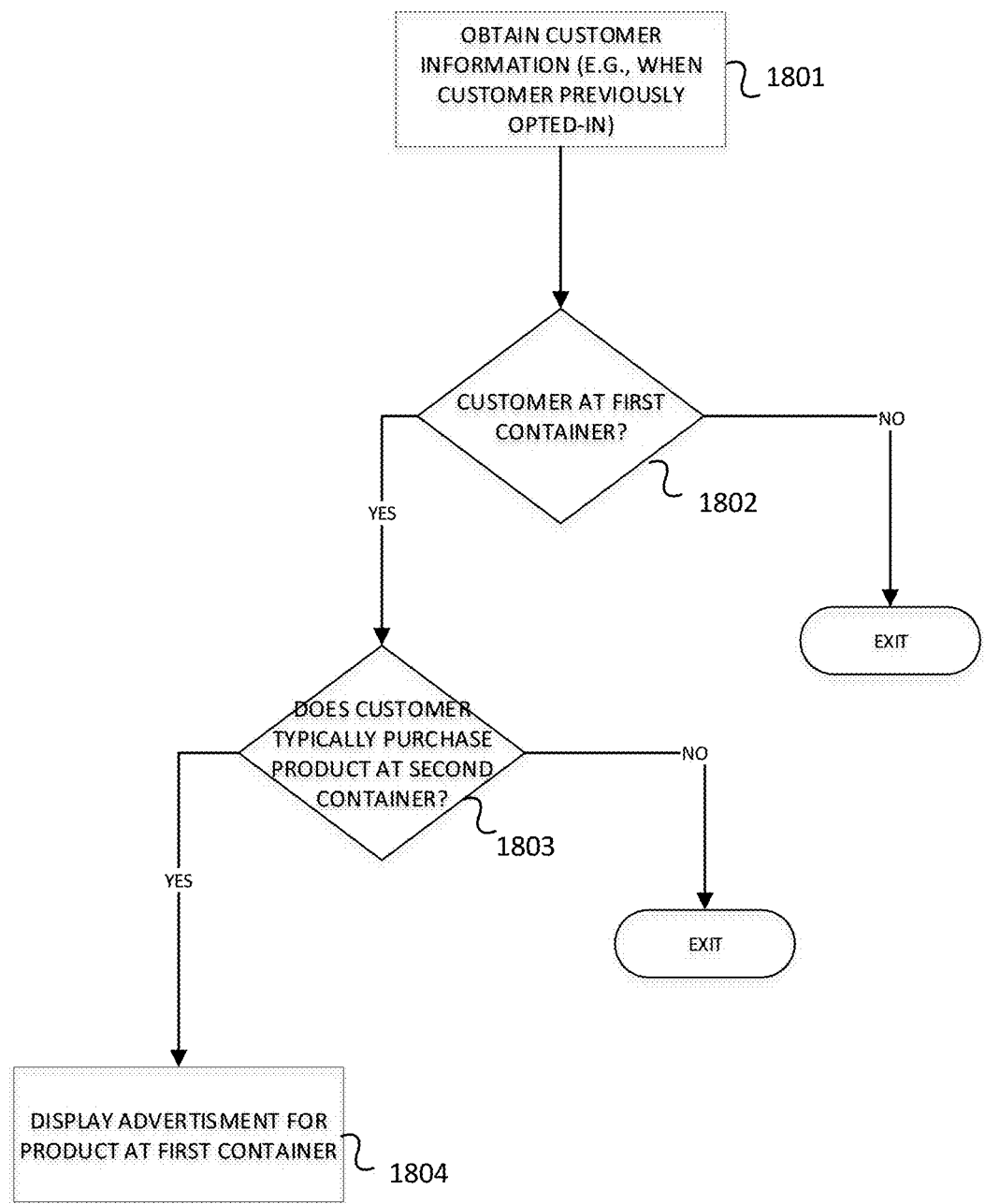
FIG. 18 shows a flowchart for displaying an advertisement at a first retail product container for a product stocked at a second retail product container in accordance with an embodiment.

FIG. 18 shows flowchart 1800 for displaying an advertisement at a first retail product container for a product stocked at a second retail product container in accordance with an embodiment. A displayed advertisement at a first retail product container (for example, retail product container 102) may promote a product that is stocked at a second retail product container (for example retail product container 103). In one embodiment of the system disclosed herein, computing platform 100 may predict that a customer will shop at the second retail product container after shopping at the first retail product container based on customer information. Meanwhile, other embodiments of the system disclosed herein operate/function without any knowledge of the individual shopper/customer, and the system never seeks to identify individuals—i.e., it is "identity-blind" in that it never gathers or uses personally identifiable or linkable information. In some embodiments, selection of whether to execute an "identity-blind" set of features or otherwise may be determined on whether the system is located in a country or state where consumers desire privacy and/or applicable laws govern.

Referring to FIG. 18, at block 1801 computing platform 100 may obtain, in one embodiment of the system disclosed herein, customer information about a customer in proximity to a first retail product container—e.g., computing platform 100 may obtain customer information about the customer likes and dislikes through a mobile app when the customer opts-in. Continuing a previous example, the customer may hate broccoli but love ice cream. Meanwhile, other embodiments of the system disclosed herein are designed with privacy and security features integrated into the technology platform and operating model. Such embodiments operate/function without any knowledge of the individual shopper/customer, and the system never seeks to identify individuals or their likes/dislikes—i.e., it never gathers or uses personally identifiable or linkable information. In such embodiments, a retail consumer-safe platform is provided that is "identity-blind." In some embodiments, selection of whether to execute an "identity-blind" set of features or otherwise may be determined on whether the system is located in a country or state where consumers desire privacy and/or applicable laws govern.

At block 1802, computing platform 100 may determine (e.g., via detection by the customer detector) whether the customer is at the first product container. If the customer is at the first product container, computing platform 100 may determine, at block 1803, whether the customer typically goes to a second retail product container, for example, where ice cream is stocked. Continuing the example, at block 1804 computing platform 100 may generate an advertisement at the first retail product container for the identified product (for example, ice cream) stocked at the second retail product container.

Figure 19:
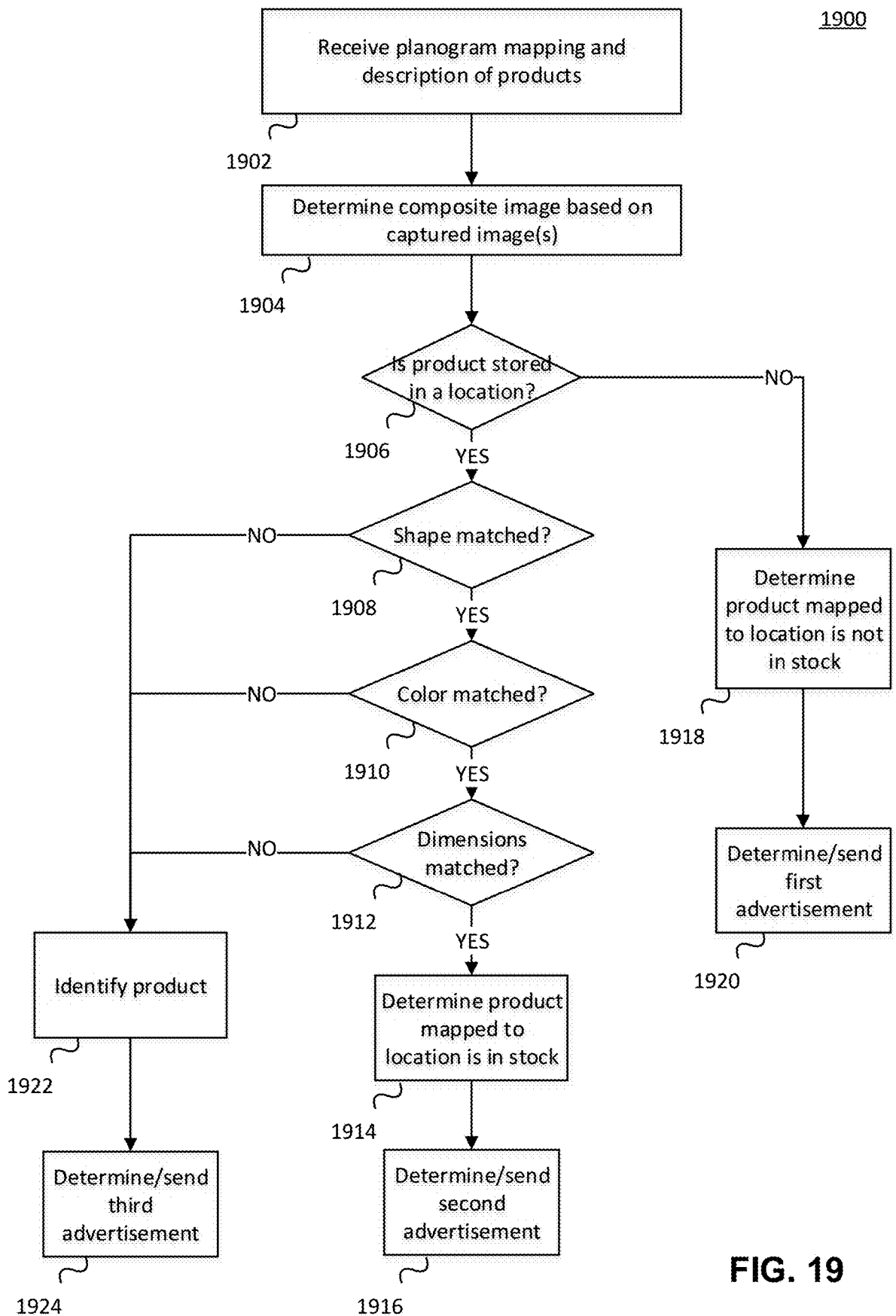
FIG. 19 shows flowchart for determining and displaying an advertisement in a display screen associated with a retail product container in accordance with an embodiment.

FIG. 19 shows flowchart 1900 for determining and displaying an advertisement in a display associated with a retail product container, in accordance with an embodiment. At block 1902, the controller (e.g., the edge computing device 101 comprising a processor and circuitry to control the retail product container) may receive (e.g., based on user input or from a cloud computing service) planogram mapping associated with a retail product container (e.g., the retail product container 102) and description of products associated with a retail product container. The controller may store the planogram mapping and the description in the data store 111. For example, the planogram mapping may indicate that a top shelf of the retail product container corresponds to a beverage which is bottle shaped, is red in color, and has first dimensions. At block 1904, the computing platform 100 may determine a composite image based on one or more images captured by one or more cameras in the retail product container.

At step 1906, the controller may determine whether a product is located in a particular location (e.g., top shelf) of the retail product container. The controller may use the composite image to make this determination. If the controller determines that no product is located in the top shelf, the controller may determine (at step 1918) that the beverage is not in stock at the retail product container. At step 1920, the controller may determine a first advertisement for display, based on determining that the beverage is not in stock. The first advertisement may comprise, for example, an artwork indicating that the beverage is out of stock. The controller may send the first advertisement, to a display controller, for display on a display device.

Continuing the example, if the controller determines that a product is stored in the top shelf, the controller may determine attributes of the stored product based on the composite image. The controller may compare the determined attributes with a description of the beverage. At step 1908, the controller may determine whether the stored product is bottle-shaped. At step 1910, the controller may determine whether the stored product is red in color. At step 1912, the controller may determine whether the stored product has first dimensions. The controller may perform steps 1908-1912 in a different order or may omit one or more of the steps 1908-1912. In an example, the composite image may be blurry and the controller may perform one or more post-processing steps to reduce the impact of blurriness on the above comparisons.

At each of the steps 1908-1912, the controller may determine a corresponding confidence score (e.g., a probability, a value between 1-10 with higher values representing higher confidence) associated with whether an attribute of the stored product corresponds to the description of the beverage. For example, the controller may determine a confidence score associated with whether the stored product is bottle-shaped, a confidence score associated with whether the stored product is red in color, and/or a confidence score associated with whether the stored product has first dimensions. Based on the determined confidence scores, the controller may determine an overall, single confidence score that corresponds to a probability of whether the attributes of the stored product match the description of the beverage. If the overall confidence score is higher than a threshold (e.g., 60%, 70%, or other appropriate value), the controller may determine (e.g., at step 1914) that the stored product is the beverage and that the beverage is in stock at the retail product container. At step 1916, the controller may determine a second advertisement for display, based on determining that the beverage is in stock. The second advertisement may comprise, for example, an artwork associated with the beverage. The controller may send the second advertisement, to the display controller, for display on the display device.

Continuing the example, if the controller determines based on steps 1908-1912 that the shape, color, and/or dimensions of the stored product at the top shelf do not match the shape, color, and dimensions of the beverage, the controller may attempt to identify the stored product. For example, the controller may scan the descriptions of products (e.g., as stored in the data store 111) to identify the stored product (as further described in FIG. 20). At step 1922, the controller may determine that the stored product is a second beverage. At step 1924, the controller may determine a third advertisement for display, based on determining that the stored product is the second beverage. The third advertisement may comprise, for example, an artwork associated with the second beverage. The controller may send the second advertisement, to the display controller, for display on the display device.

Figure 20:
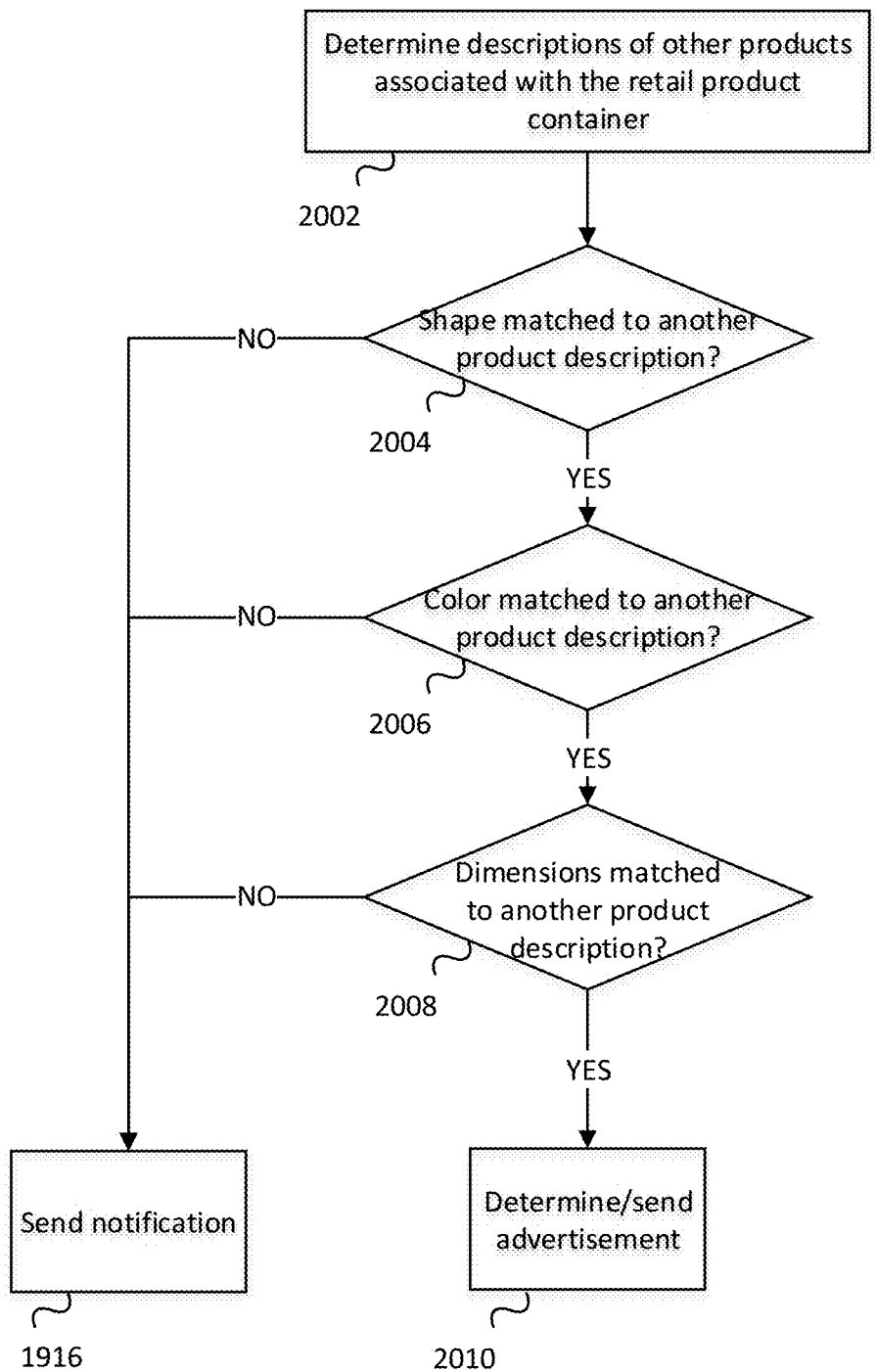
FIG. 20 shows flowchart for determining and displaying an advertisement in a display screen associated with a retail product container in accordance with an embodiment.

FIG. 20 shows flowchart 2000 for determining and displaying an advertisement in a display associated with a retail product container, in accordance with an embodiment. The controller may perform the method of FIG. 20, for example, if the controller determines based on steps 1908-1912 that the shape, color, and/or dimensions of the stored product at the top shelf do not match the shape, color, and dimensions of the beverage. At step 2002, the controller may scan descriptions of other products in the data store 111 to determine shapes, colors, and dimensions associated with the other products. Continuing with the above example, the data store 111 may comprise a description of the second beverage which is bottle shaped, is blue in color, and has second dimensions.

The controller may determine attributes of the stored product based on the composite image. The controller may compare the determined attributes with a description of the second beverage. At step 2004, the controller may determine whether the stored product is bottle-shaped. At step 2006, the controller may determine whether the stored product is blue in color. At step 2008, the controller may determine whether the stored product has second dimensions. The controller may perform steps 2004-2008 in a different order or may omit one or more of the steps 2004-2008. The controller may determine an overall confidence score that corresponds to a probability of whether the attributes of the stored product match the description of the second beverage (e.g., as described above with reference to FIG. 19). If the overall confidence score is higher than a threshold (e.g., 60%, 70%, or any other value), the controller may determine that the stored product is the second beverage and that the second beverage is in stock at the retail product container. At step 2010, the controller may determine an advertisement for display, based on determining that the second beverage is in stock. The advertisement may comprise, for example, an artwork associated with the second beverage. The controller may send the advertisement, to the display controller, for display on the display device.

Continuing the example, if the controller determines based on steps 2004-2008 that the shape, color, and/or dimensions of the stored product at the top shelf do not match the shape, color, and dimensions of any product indicated in the planogram mapping, the controller may, at step 1916, send a notification (e.g., to the wireless device 106 or another computing device that may be accessible to a retailer stocking clerk). The notification may indicate that an unidentified product is in the retail product container.

In some embodiments, a non-transitory computer readable medium storing instructions thereon is disclosed. One or more aspects of the disclosure may be embodied in computer-usable data or computer-executable instructions, such as in one or more program modules stored on a computer readable medium, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing systems discussed above may be combined into a single computing system, and the various functions of each computing system may be performed by the single computing system. In such arrangements, any and/or all of the above-discussed communications between computing system may correspond to data being accessed, moved, modified, updated, and/or otherwise used by the single computing system.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A smart, movable closure system configured for installation in a retail environment requiring a cabinet adapted to be kept at a temperature cooler than an exterior cabinet ambient temperature, the system comprising:
   an internal storage volume of a retail product container storing perishable items for purchase in the retail environment;
   a movable door prohibiting viewing of the internal storage volume;
   a display device affixed to the movable door, wherein the display device is configured to display at least a planogram of the internal storage volume, wherein the planogram comprises an out-of-stock indicator;
   an optical sensor installed on the movable door to capture one or more images of the internal storage volume of the retail product container;
   a controller communicatively coupled to the display device;
   a data store comprising an inputted planogram mapping of the internal storage volume and a description of a plurality of products, wherein the description comprises shape, color, and dimension of each of the plurality of products;
   one or more processors in a proximity of the retail product container, and
   a memory storing computer readable instructions that, when executed by the one or more processors, causes the one or more processors to:
     post-process the one or more images captured by the optical sensor into a composite image;
     determine, based on the composite image, the inputted planogram mapping, and the description of the plurality of products, an inventory status of a product, among the plurality of products, in the retail product container;
     calculate a confidence score based on the composite image and the description of the plurality of products;
     reevaluate, using a machine learning mode, the confidence score based on feedback providing a degree of correctness on the confidence score;
     determine that the product is out-of-stock in the internal storage volume when the confidence score is below a threshold value;
     determine, based on the determined inventory status, an advertisement to be displayed on the display device, wherein the advertisement comprises the out-of-stock indicator when the inventory status of the product is out of stock; and
     send, to the controller, the advertisement for display on the display device.

2. The smart, movable closure system of claim 1, wherein the inputted planogram mapping comprises:
   an indication of the product; and
   an indication of a specified location of the product.

3. The smart, movable closure system of claim 2, wherein the determining the inventory status of the product comprises determining, based on the composite image, that no product is detected at the specified location.

4. The smart, movable closure system of claim 3, wherein the optical sensor is configured to capture a plurality of images during operation of the movable door, wherein the operation comprises opening of the movable door and closing of the movable door.

5. The smart, movable closure system of claim 3, wherein the advertisement comprises an artwork associated with a different product.

6. The smart, movable closure system of claim 3, wherein the instructions, when executed by the one or more processors, causes the one or more processors to transmit, to a computing device, a message indicating that the product is not in the retail product container.

7. The smart, movable closure system of claim 2, wherein the determining the inventory status of the product comprises identifying, based on the composite image, the stored product in the retail product container, and further determining at least one selected from:
   a location of the stored product;
   a shape of the stored product;
   a color of the stored product;
   dimensions of the stored product; and combination thereof.

8. The smart, movable closure system of claim 7, wherein the determining the inventory status of the product comprises determining that the product is present in the retail product container based on at least one selected from:
   determining that the location of the stored product corresponds to the specified location;
   determining that the shape of the stored product corresponds to a shape of the product in the description;
   determining that the color of the stored product corresponds to a color of the product in the description; and
   determining that the dimensions of the stored product corresponds to dimensions of the product in the description; and combination thereof.

9. The smart, movable closure system of claim 7, wherein the advertisement comprises artwork associated with the product.

10. The smart, movable closure system of claim 2, wherein the determining the inventory status of the product comprises determining that another product is present at the specified location in the retail product container based on at least one selected from:
    determining that a shape of the another product does not correspond to a shape of the product in the description;
    determining that a color of the another product does not correspond to a color of the product in the description;
    determining that dimensions of the another product does not correspond to dimensions of the product in the description; and combination thereof.

11. The smart, movable closure system of claim 2, wherein the determining the inventory status of the product comprises:
    comparing one or more attributes of a stored product in the composite image with the description of the product in the inputted planogram mapping.

12. The smart, movable closure system of claim 1, wherein the determining the inventory status of the product comprises determining a quantity of the product in the retail product container.

13. The smart, movable closure system of claim 1, wherein the advertisement comprises a planogram comprising artworks associated with the plurality of products.

14. The smart, movable closure system of claim 1, further comprising, receiving, from a computing device, the inputted planogram mapping.

15. The smart, movable closure system of claim 1, wherein the data store is located in the retail environment, and wherein the one or more images are captured based on operation of the movable door.

16. A method for generating advertisement content on a display screen affixed to a movable door attached to a retail product container comprising an internal storage volume, the method comprising:

determining an inputted planogram mapping of the internal storage volume and a description of a plurality of products, wherein the description comprises shape, color, and dimension of each of the plurality of products;

post-processing one or more images captured by an optical sensor, installed on the movable door, into a composite image;

determining, based on the composite image, the inputted planogram mapping, and the description of the plurality of products, an inventory status of a product, among the plurality of products, in the retail product container;

calculating a confidence score based on the composite image and the description of the plurality of products;

reevaluating, using a machine learning mode, the confidence score based on feedback providing a degree of correctness on the confidence score;

determining that the product is out-of-stock in the internal storage volume when the confidence score is below a threshold value; determining, based on the determined inventory status, an advertisement to be displayed on the display screen, wherein the advertisement to be displayed comprises an out-of-stock indicator indicating that the product is out of stock; and sending the advertisement for display on the display screen.

17. The method of claim 16, wherein the inputted planogram mapping comprises:

an indication of the product; and
an indication of a specified location of the product.

18. The method of claim 17, wherein:

the determining the inventory status of the product comprises determining, based on the composite image, that no product is detected at the specified location, and the advertisement comprises an out-of-stock indicator indicating that the product is out of stock.

19. A computer platform of a cooling system comprising a retail product container with an internal storage volume, a movable door blocking a view of the internal storage volume, a display affixed to the movable door, wherein the display is configured to display at least a planogram of the internal storage volume, and an optical sensor affixed on the movable door, the computing platform comprising:

one or more processors; and
a memory storing computer-executable instructions that, when executed by the one or more processors, causes the one or more processors to:

determine an inputted planogram mapping of the internal storage volume and a description of a plurality of products, wherein the description comprises shape, color, and dimension of each of the plurality of products;

post-process one or more images captured by the optical sensor, installed on the movable door, into a composite image;

determine, based on the composite image, the inputted planogram mapping, and the description of the plurality of products, an inventory status of a product, among the plurality of products, in the retail product container;

calculate a confidence score based on the composite image and the description of the plurality of products;

reevaluate, using a machine learning mode, the confidence score based on feedback providing a degree of correctness on the confidence score;

determine that the product is out-of-stock in the internal storage volume when the confidence score is below a threshold value;

determine, based on the determined inventory status, an advertisement to be displayed on the display, wherein the advertisement to be displayed comprises an out-of-stock indicator indicating that the product is out of stock; and sending the advertisement for display on the display.

20. The computing platform of claim 19, wherein the planogram mapping comprises:

an indication of the product; and
an indication of a specified location of the product.

* * * * *